(12) United States Patent
Miyake et al.

(10) Patent No.: US 11,828,613 B2
(45) Date of Patent: Nov. 28, 2023

(54) SUPERIMPOSED-IMAGE DISPLAY DEVICE

(71) Applicant: AISIN CORPORATION, Kariya (JP)

(72) Inventors: Hiroyuki Miyake, Kariya (JP); Kenji Watanabe, Kariya (JP); Takashi Kawai, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/863,673

(22) Filed: Jul. 13, 2022

(65) Prior Publication Data

US 2023/0013965 A1 Jan. 19, 2023

(30) Foreign Application Priority Data

Jul. 14, 2021 (JP) .................. 2021-116476

(51) Int. Cl.
*G01C 21/36* (2006.01)
*G06F 3/14* (2006.01)
*H04N 5/272* (2006.01)

(52) U.S. Cl.
CPC ........... *G01C 21/3632* (2013.01); *G06F 3/14* (2013.01); *H04N 5/272* (2013.01)

(58) Field of Classification Search
CPC ........ G01C 21/3632; G06F 3/14; H04N 5/272
See application file for complete search history.

(56) References Cited

U.S. PATENT DOCUMENTS

| 10,694,262 | B1* | 6/2020 | Hedman | H04N 21/44008 |
| 2017/0060234 | A1* | 3/2017 | Sung | B60K 37/00 |
| 2017/0187963 | A1* | 6/2017 | Lee | G02B 27/01 |
| 2019/0204104 | A1* | 7/2019 | Kimura | G01C 21/3679 |
| 2020/0249044 | A1 | 8/2020 | Watanabe et al. | |
| 2021/0104212 | A1* | 4/2021 | Horihata | G09G 5/377 |
| 2021/0223058 | A1 | 7/2021 | Horihata et al. | |

FOREIGN PATENT DOCUMENTS

| JP | 2019-095215 A | 6/2019 |
| JP | 2020-097399 A | 6/2020 |

* cited by examiner

*Primary Examiner* — Dalena Tran
(74) *Attorney, Agent, or Firm* — Sughrue Mion, PLLC

(57) ABSTRACT

Provided is a superimposed-image display device configured such that when there is a guidance divergence point, which is a guidance target, ahead in a traveling direction of a vehicle, a plurality of guidance objects that provide guidance on an entry route that enters the guidance divergence point and an exit route are displayed. When a course including the entry route, the guidance divergence point, and the exit route is displayed using a plurality of guidance objects, the plurality of guidance objects are displayed so as to match the elevation of the line of sight of an occupant and displayed so as to be shifted to locations that are on the opposite side to an exit direction at the guidance divergence point relative to the front of the vehicle.

10 Claims, 17 Drawing Sheets

State of having approached guidance divergence point

State of having approached guidance divergence point

SUPERIMPOSED-IMAGE DISPLAY DEVICE

INCORPORATION BY REFERENCE

The disclosure of Japanese Patent Application No. 2021-116476 filed on Jul. 14, 2021, including the specification, drawings and abstract is incorporated herein by reference in its entirety.

BACKGROUND OF THE DISCLOSURE

(1) Field of the Disclosure

The present disclosure relates to a superimposed-image display device that provides vehicle travel assistance.

(2) Description of Related Art

Conventionally, various means are used as information providing means for providing an occupant of a vehicle with various types of information for providing vehicle travel assistance, such as route guidance and warnings against obstacles. Examples of such means include display performed on a liquid crystal display installed on the vehicle and audio outputted from a speaker. In recent years, as one of such information providing means, there has been a device that provides information by displaying an image that is superimposed on an occupant's surrounding environment (a view or an actual view). Such means corresponds, for example, to a head-up display and a windshield display, and a method of displaying an image such that the image is superimposed on a captured image of an area around the vehicle that is displayed on a liquid crystal display.

For example, JP 2020-97399 A discloses a technique in which when a vehicle approaches an intersection which is a guidance target, a virtual image is displayed superimposed on a vehicle's front view, to provide guidance on a course. A display control device disclosed in JP 2020-97399 A displays a plurality of triangular guidance objects side by side such that the triangular guidance objects are superimposed at locations on a road surface of a road ahead of a vehicle. The display control device displays a plurality of guidance objects side by side on a windshield along a planned travel course with a left or right turn.

SUMMARY OF THE DISCLOSURE

When guidance on a course is provided to an occupant of a vehicle by superimposing guidance objects on an image of a front view of the vehicle as described above, it is effective to display the guidance objects to be superimposed such that the guidance objects match the elevation of the line of sight of the occupant. However, in the technique described in the above-described JP 2020-97399 A (FIG. 18), a plurality of guidance objects are displayed side by side along a course on a road surface in front of a host vehicle. In this display method, when guidance objects are displayed at the elevation of the line of sight of the occupant, there is a possibility that intervals between a plurality of guidance objects present far away from the host vehicle decrease, resulting in the guidance objects overlapping each other. Due to the overlapping of the plurality of guidance objects, the visibility of the guidance objects decreases, causing a problem that the occupant has difficulty in understanding a guidance route.

Aspects of the present disclosure are made to solve the above-described conventional problem, and to provide a superimposed-image display device that increases the visibility of guidance objects, by which guidance on a course that is easier to understand can be provided to an occupant.

To achieve the above-described aspects, a superimposed-image display device according to the present disclosure is mounted on a vehicle and superimposes a guidance object on a view around the vehicle so that an occupant of the vehicle visually identifies the guidance object, the guidance object providing guidance on a course to the occupant, and the superimposed-image display device includes object displaying means for displaying a plurality of guidance objects when there is a guidance divergence point ahead in a traveling direction of the vehicle, the guidance divergence point being a guidance target, and the plurality of guidance objects providing guidance on an entry route that enters the guidance divergence point and an exit route that exits from the guidance divergence point, and the object displaying means displays a course including the entry route, the guidance divergence point, and the exit route using the plurality of guidance objects, displays the plurality of guidance objects such that the plurality of guidance objects match an elevation of a line of sight of the occupant of the vehicle, and displays the plurality of guidance objects such that the plurality of guidance objects are shifted toward an opposite side to an exit direction at the guidance divergence point relative to front of the vehicle.

Note that the "view" includes an image obtained by capturing a view, an image that reproduces a view, etc., in addition to a view (actual view) that is actually visually identified from the vehicle.

According to the superimposed-image display device according to the present disclosure that has the above-described configuration, the visibility of guidance objects increases, allowing the occupant to more clearly recognize a course of the vehicle.

DETAILED DESCRIPTION OF PREFERRED EMBODIMENTS

A first embodiment and a second embodiment in which a superimposed-image display device according to the present disclosure is embodied into a navigation device will be described in detail below with reference to the drawings.

First Embodiment

Figure 1:
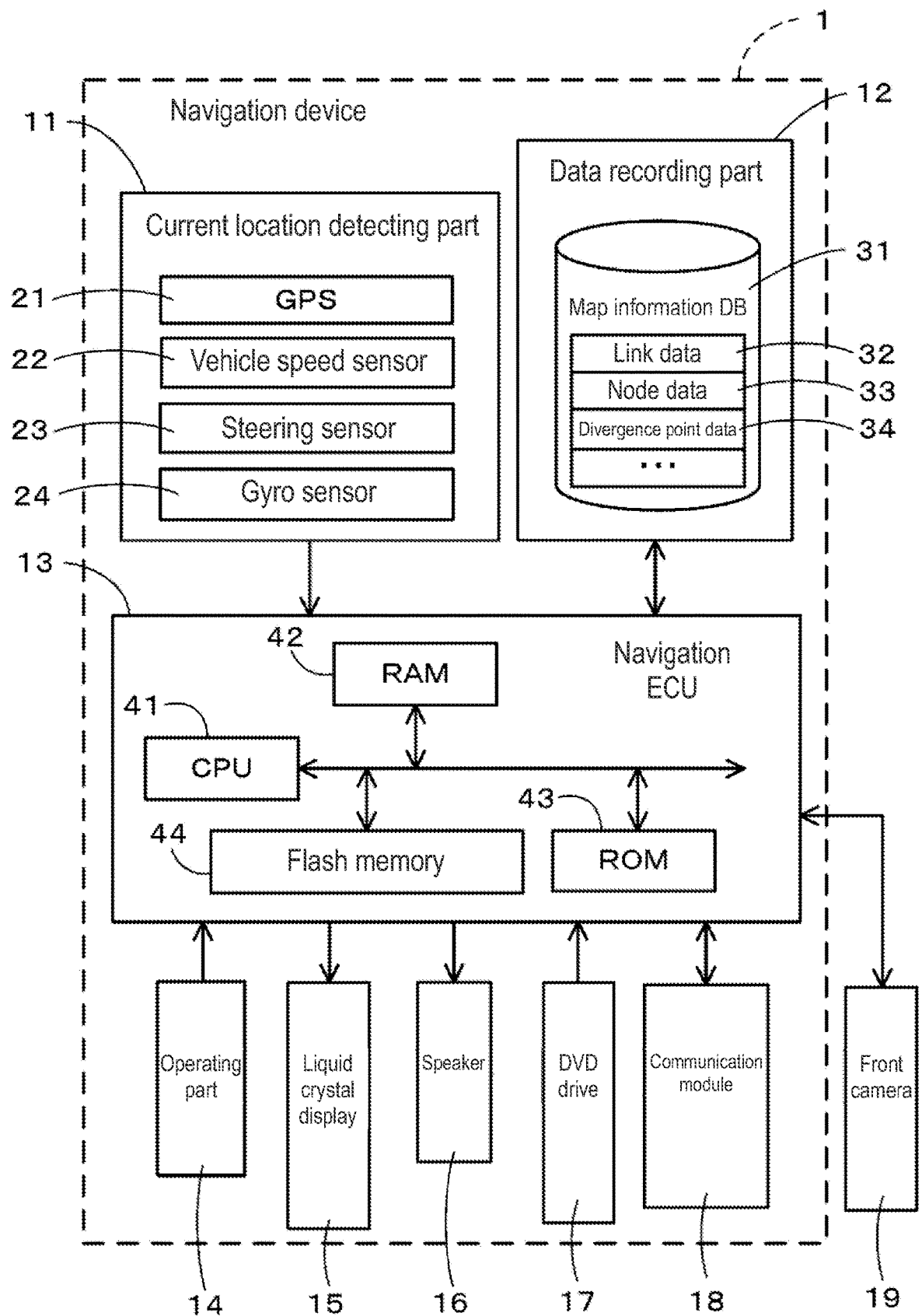
FIG. 1 is a block diagram showing a navigation device according to a first embodiment.

First, a schematic configuration of a navigation device 1 according to a first embodiment will be described using FIG. 1. FIG. 1 is a block diagram showing the navigation device 1 according to the first embodiment.

As shown in FIG. 1, the navigation device 1 according to the first embodiment includes a current location detecting part 11 that detects a current location of a vehicle having the navigation device 1 mounted thereon; a data recording part 12 having various types of data recorded therein; a navigation ECU 13 that performs various types of arithmetic processing based on inputted information; an operating part 14 that accepts operations from a user; a liquid crystal display 15 that displays to the user an actual view image obtained by capturing an area ahead in a traveling direction; a speaker 16 that outputs voice guidance about route guidance; a DVD drive 17 that reads a DVD which is a storage medium; and a communication module 18 that performs communication with information centers such as a probe center and a VICS (registered trademark: Vehicle Information and Communication System) center. In addition, a front camera 19 and various sensors which are installed on the vehicle having the navigation device 1 mounted thereon are connected to the navigation device 1 through an in-vehicle network such as a controlled area network (CAN).

Components included in the navigation device 1 will be described in turn below.

The current location detecting part 11 includes a GPS 21, a vehicle speed sensor 22, a steering sensor 23, a gyro sensor 24, etc., and can detect the current location and orientation of the vehicle, a travel speed of the vehicle, a current time, etc. Here, particularly, the vehicle speed sensor 22 is a sensor for detecting the moving distance and vehicle speed of the vehicle, and generates pulses according to the rotation of drive wheels of the vehicle and outputs a pulse signal to the navigation ECU 13. Then, the navigation ECU 13 counts the generated pulses, thereby calculating the rotational speed and moving distance of the drive wheels. Note that the navigation device 1 does not need to include all of the above-described four types of sensors, and the navigation device 1 may be configured to include only one or a plurality of types of sensors among those sensors.

In addition, the data recording part 12 includes a hard disk (not shown) serving as an external storage device and a recording medium; and a recording head (not shown) which is a driver for reading a map information DB 31 recorded on the hard disk, a predetermined program, etc., and writing predetermined data to the hard disk. Note that the data recording part 12 may include a flash memory, a memory card, or an optical disc such as a CD or a DVD, instead of a hard disk. In addition, it may be configured such that the map information DB 31 is stored in an external server and is obtained by the navigation device 1 by communication.

Here, the map information DB 31 is storage means having stored therein, for example, link data 32 about roads (links), node data 33 about node points, divergence point data 34 about divergence points, point data about points such as facilities, map display data for displaying a map, search data for searching for a route, and retrieval data for retrieving a point.

In addition, as the link data 32, the following data is recorded: for each of links that form a road, there is recorded data representing the width, gradient, cant, bank, and road surface state of the road to which the link belongs, the number of lanes on the road, a location where the number of lanes decreases, a location where the width becomes narrower, a railroad crossing, etc.; for a corner, there is recorded data representing the radius of curvature, an intersection, a T-junction, the entrance and exit of the corner, etc.; for road attributes, there is recorded data representing downhill slopes, uphill slopes, etc.; and for road types, there is recorded data representing expressways and general roads (national highways, prefectural highways, narrow streets, etc.).

In addition, as the node data 33, there is recorded, for example, data about actual road divergence points (also including intersections, T-junctions, etc.), the coordinates (locations) of node points that are set on each road every predetermined distance according to the radius of curvature, etc., node attributes representing, for example, whether a node corresponds to an intersection, a connected-link number list which is a list of link numbers of links connected to nodes, an adjacent node number list which is a list of node numbers of nodes adjacent to a node with a link therebetween, the height (elevation) of each node point, etc.

In addition, as the divergence point data 34, there are stored, for example, corresponding node information that identifies the name of an intersection at a divergence point and a node that forms the divergence point, connected-link information that identifies a link connected to a divergence point, and information that identifies the name of an area corresponding to a link connected to a divergence point, and the configuration of the divergence point. In addition, there is also stored a structure that can serve as a landmark when left or right turn guidance is provided at a divergence point.

Meanwhile, the navigation ECU (electronic control unit) 13 is an electronic control unit that performs overall control of the navigation device 1, and includes a CPU 41 serving as a computing device and a control device; and internal storage devices such as a RAM 42 that is used as a working memory when the CPU 41 performs various types of arithmetic processing and that stores route data obtained when a route is searched, etc., a ROM 43 having recorded therein a program for control, a travel assistance process program (FIG. 2) which will be described later, etc., and a flash memory 44 that stores a program read from the ROM 43. Note that the navigation ECU 13 includes various types of means serving as processing algorithms. For example, object displaying means displays, when there is a guidance divergence point, which is a guidance target, ahead in a traveling direction of the vehicle, guidance objects that provide guidance on a course at the guidance divergence point.

The operating part 14 is operated, for example, upon inputting a point of departure which is a travel start point and a destination which is a travel end point, and includes a plurality of operating switches such as various types of keys and buttons (not shown). Based on a switch signal outputted by, for example, depression of a given switch, the navigation ECU 13 performs control to perform a corresponding one of various types of operation. Note that the operating part 14 may be configured to include a touch panel provided on the front of the liquid crystal display 15. Note also that the operating part 14 may be configured to include a microphone and a voice recognition device.

In addition, on the liquid crystal display 15 there are displayed a map image including roads, traffic information, operation guidance, an operation menu, guidance on keys, a guidance route from a point of departure to a destination, guidance information provided along a guidance route, news, weather forecasts, time, e-mails, TV programs, etc. In addition, particularly, in the first embodiment, upon traveling, a captured image that is captured by the front camera 19, i.e., a view (actual view image) around the vehicle (particularly, ahead of the vehicle) at the present time, is displayed on the liquid crystal display 15, and guidance objects are further displayed superimposed on the view, as necessary.

Here, the guidance objects displayed superimposed on the view include various types of information used to assist in occupant's driving and information about the vehicle. The guidance objects include, for example, a guidance route set on the navigation device 1, guidance information based on the guidance route (a course of the vehicle, a traveling direction, a lane that the vehicle is to enter, an arrow indicating a left or right turn direction, an icon indicating a landmark of a guidance divergence point, a distance to the guidance divergence point, etc.), warnings against objects (other vehicles, pedestrians, or guidance signs) which are warning targets for the occupant, warnings (collision warnings, speed limits, etc.) provided on a road surface, a section line on a lane in which the vehicle travels, current vehicle speed, shift position, the amount of remaining energy, advertising images, facility information, guidance signs, map images, traffic information, news, weather forecasts, time, and a screen of a connected smartphone. Note that in the first embodiment which will be described below, a case of adopting, as guidance objects, guidance information for providing guidance on a vehicle's future course at a guidance divergence point present ahead in a traveling direction of the vehicle will be described. More specifically, as guidance objects, triangular graphics are adopted that are displayed so as to match the elevation of the line of sight of the occupant, and that are displayed superimposed such that the triangular graphics are shifted to locations that are on the opposite side to an exit direction at a guidance divergence point relative to the front of the vehicle, and that indicate a vehicle's future course.

In addition, the speaker 16 outputs voice guidance that provides guidance on travel along a guidance route or guidance on traffic information, based on an instruction from the navigation ECU 13.

In addition, the DVD drive 17 is a drive that can read data recorded on a recording medium such as a DVD or a CD. Based on the read data, for example, music or video is played back or the map information DB 31 is updated. Note that instead of the DVD drive 17, a card slot for performing reading and writing on a memory card may be provided.

In addition, the communication module 18 is a communication device for receiving traffic information that includes pieces of information such as congestion information, regulation information, and traffic accident information and that is transmitted from traffic information centers, e.g., a VICS center and a probe center. The communication module 18 corresponds, for example, to a mobile phone or a DCM.

In addition, the front camera 19 is, for example, an imaging device including a camera that uses a solid-state imaging device such as a CCD, and is installed such that an optical-axis direction is directed ahead in a traveling direction of the vehicle. The front camera 19 is mounted on, for example, the back of a rearview mirror 20 of the vehicle (see FIG. 11). A captured image that is captured by the front camera 19 is, as described above, displayed on the liquid crystal display 15, as a view (actual view image) around the vehicle (particularly, ahead of the vehicle). Note that the front camera 19 may be mounted on other locations such as a bumper.

Next, a travel assistance process program executed by the navigation ECU 13 in the navigation device 1 having the above-described configuration will be described based on FIGS. 2 to 7. FIGS. 2 to 7 are flowcharts of a travel assistance process program according to the first embodiment. Here, the travel assistance process program is a program that is executed after an ACC power supply (accessory power supply) of the vehicle is turned on, and that provides vehicle travel assistance by allowing the occupant to visually identify guidance objects superimposed on a view around the vehicle that is displayed on the liquid crystal display 15. Note that the program shown in the flowcharts of the following FIGS. 2 to 7 is stored in the RAM 42 or the ROM 43 included in the navigation device 1, and is executed by the CPU 41.

In the following description, an example will be described in which as vehicle travel assistance using guidance objects, vehicle course guidance along a guidance route set on the navigation device 1 is provided. In addition, as an example, a process will be described that is performed when, as guidance objects to be displayed that serve as guidance information for providing guidance at a guidance divergence point present ahead in a traveling direction of the vehicle, a plurality of triangular images are displayed in a superimposed manner such that the triangular images are located ahead in the traveling direction of the vehicle and match the elevation of the line of sight of the occupant, the triangular images are displayed so as to be shifted to locations that are on the opposite side to an exit direction at the guidance divergence point relative to the front of the vehicle, and the triangular images indicate a vehicle's future course. Note, however, that the navigation device 1 can also provide guidance other than the above-described travel assistance or provide information, using guidance objects. In addition, as guidance objects to be displayed, information other than the above-described triangular images can also be used. For example, it is also possible to display, as guidance objects, arrows indicating a course, warnings against objects (other vehicles, pedestrians, or guidance signs) which are warning targets for the occupant, warnings (collision warnings, speed limits, etc.) provided on a road surface, a section line on a lane in which the vehicle travels, current vehicle speed, shift position, the amount of remaining energy, advertising images, facility information, guidance signs, map images, traffic information, news, weather forecasts, time, a screen of a connected smartphone, etc. In addition to the above-described guidance objects, images on a road surface that indicate a course may be used in combination. In addition, the occupant is not limited to a driver and may be a passenger.

Figure 8:
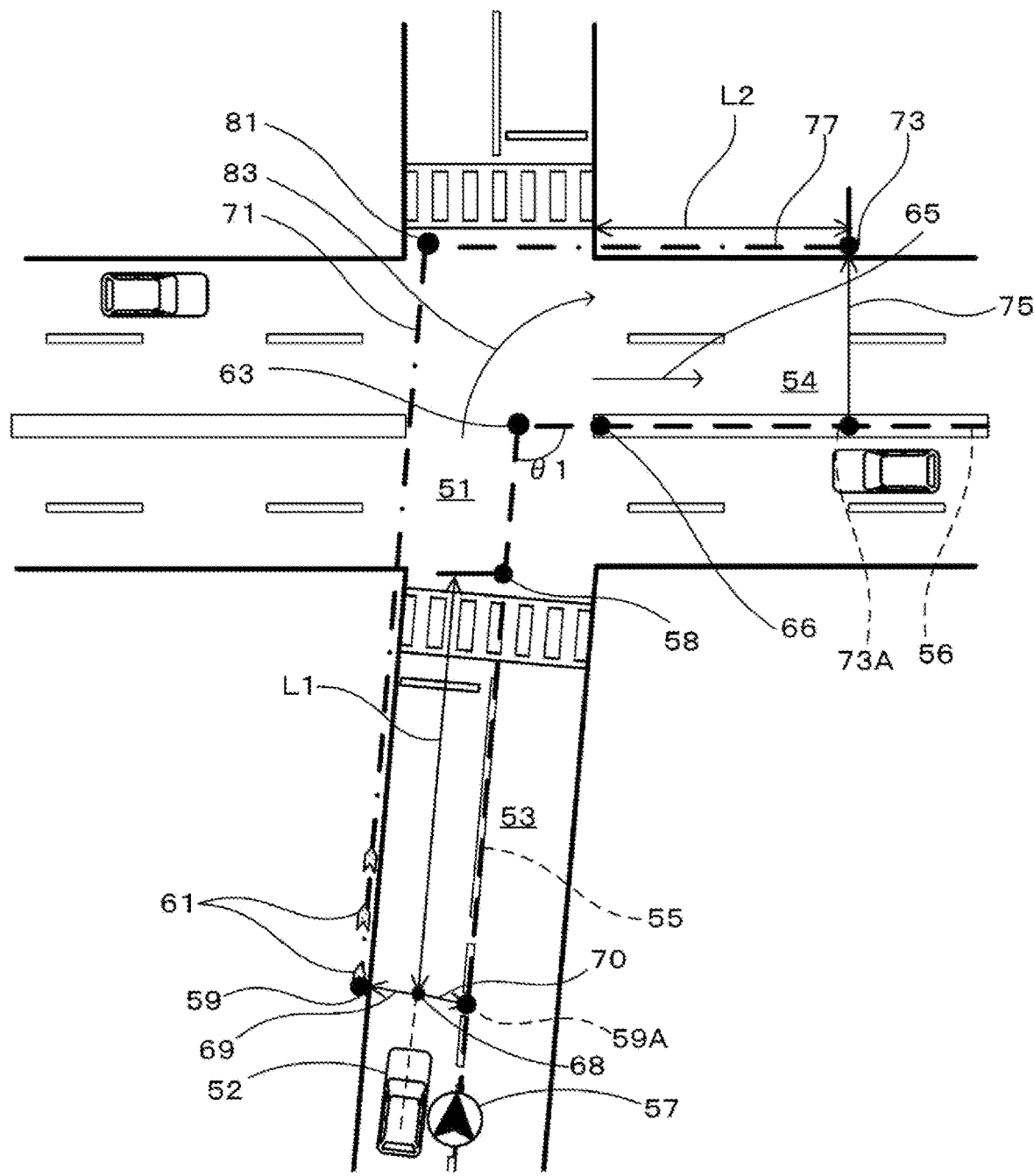
FIG. 8 is a diagram for describing a vehicle that is traveling toward a guidance divergence point.

FIG. 8 shows a state of a vehicle 52 traveling toward a guidance divergence point 51. In the following description, as an example, a case will be described in which guidance is provided on a course where the vehicle 52 enters the guidance divergence point 51 at a crossroads from an entry route 53 and turns right to travel toward an exit route 54. Note that the guidance divergence point of the present application is not limited to a crossroads and may be a T-junction, a Y-junction, or a divergence point where a plurality of (five or more) roads are connected together. In addition, the guidance divergence point may be, for example, a divergence point having connected thereto an entry road to or an exit road from not only a general road but also an expressway. Namely, the navigation device 1 may provide guidance using guidance objects on an expressway. In addition, the guidance divergence point is a divergence point (intersection) at which guidance on a left or right turn instruction, etc., is to be provided when the navigation device 1 provides guidance on travel according to a guidance route set on the navigation device 1.

In addition, a dashed line of FIG. 8 indicates an entry-side link 55 which is a link of the entry route 53 and an exit-side link 56 which is a link of the exit route 54. In the navigation device 1 of the present embodiment, for example, based on the link data 32 in the map information DB 31 (see FIG. 1), a host-vehicle icon 57 indicating a host vehicle is displayed on, for example, a guidance map on the liquid crystal display 15, assuming that the host vehicle travels on a link indicating the coordinates of the center of each road. Note that for convenience of description, FIG. 8 shows, for example, the host-vehicle icon 57 and link data 32 (the entry-side link 55 and the exit-side link 56) in the map information DB 31 which are displayed on the liquid crystal display 15. In addition, the link data 32 such as the entry-side link 55 and the exit-side link 56 is not limited to information set at the centers of roads and may be, for example, information set for each traveling direction of a road, each lane, etc. In this case, too, as in a case of setting the link data 32 at the centers of roads which will be described below, guidance objects 61 can be set with reference to links.

First, in the travel assistance process program, at step (hereinafter, abbreviated as S) 1 of FIG. 2, the CPU 41 obtains a distance from a current location of the vehicle to a next guidance divergence point 51. At S1, the CPU 41 calculates, as the distance to the next guidance divergence point 51, for example, a distance between the coordinates of a current location of the host vehicle which is detected by the current location detecting part 11 and the coordinates of an entry location 58 at the guidance divergence point 51 obtained based on the map information DB 31 (see FIG. 8). The entry location 58 is, for example, a boundary between the guidance divergence point 51 and the entry route 53 and a location on the entry-side link 55, i.e., a location at the center of a road on the entry route 53. The entry location 58 is set, for example, based on the map information DB 31.

Subsequently, at S2, the CPU 41 determines whether the distance to the guidance divergence point 51 which is obtained at S1 is less than a process start distance. As shown in FIG. 8, the CPU 41 starts display of guidance objects 61, for example, at a guidance start location 59 away by a predetermined distance from the guidance divergence point 51. Note that in order to avoid the drawing from getting complicated, FIG. 8 only shows some guidance objects 61 present on a guidance start location 59 side among a plurality of guidance objects 61. The guidance start location 59 is set at a location away by a first distance L1 from the entry location 58 (guidance divergence point 51). The process start distance at S2 is, for example, a distance for determining the timing of starting prior preparation so that display of guidance objects 61 can start when the vehicle 52 reaches the guidance start location 59, i.e., a location away by the first distance L1 from the guidance divergence point 51. While the CPU 41 determines that the distance from a current location to the guidance divergence point 51 is greater than or equal to the process start distance (S2: NO), the CPU 41 repeatedly performs the processes at S1 and S2.

Figure 3:
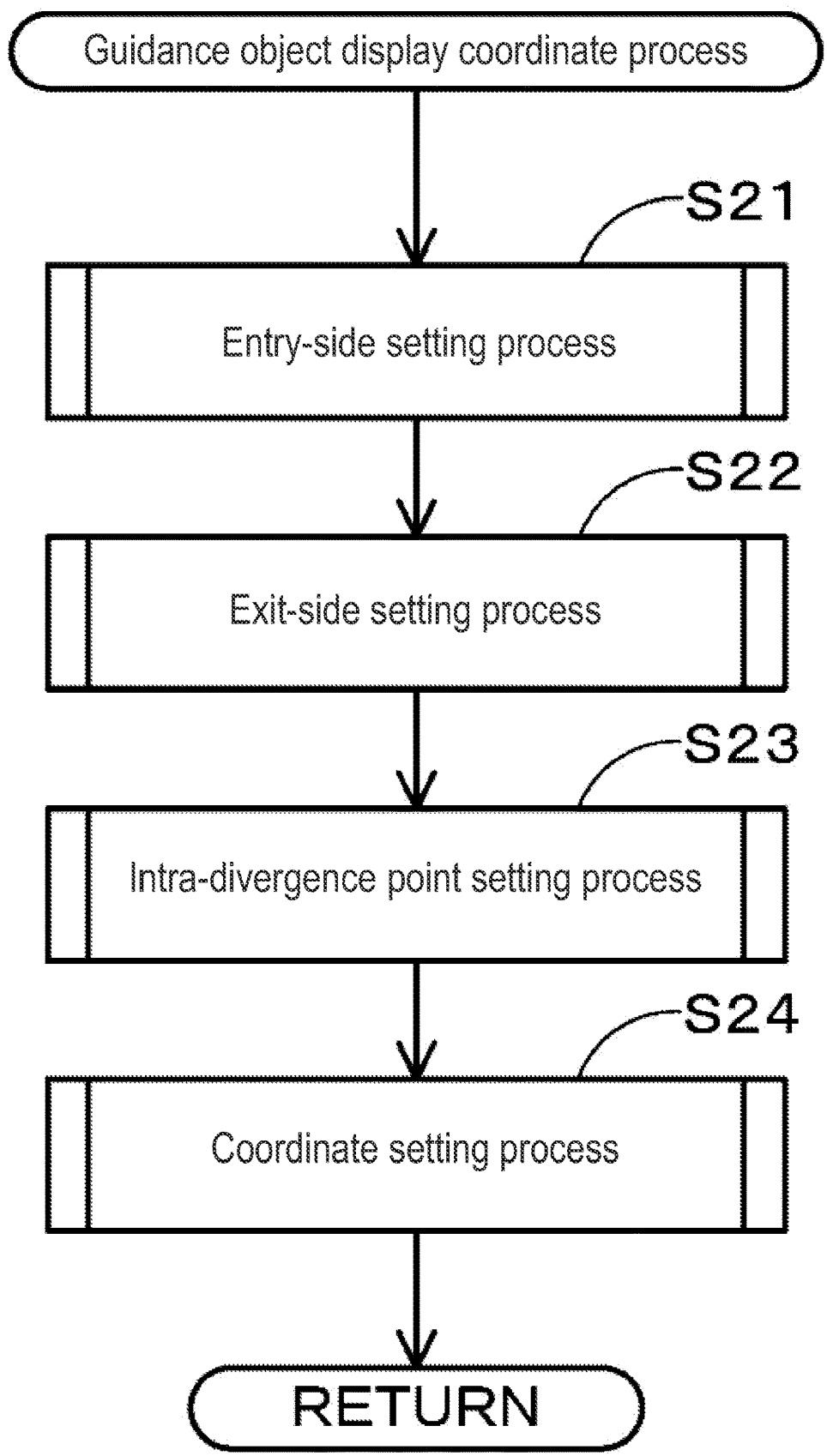
FIG. 3 is a flowchart of a guidance object display coordinate process program which is a sub-process program for a travel assistance process.

On the other hand, if the CPU 41 determines that the distance to the guidance divergence point 51 is less than the process start distance (S2: YES), then the CPU 41 performs a guidance object display coordinate process (S3). FIG. 3 shows a flowchart of a guidance object display coordinate process program. The CPU 41 sets and obtains the coordinates of guidance objects 61 to be displayed, by performing the guidance object display coordinate process. When the CPU 41 starts the guidance object display coordinate process, first, the CPU 41 performs an entry-side setting process (S21).

Entry-Side Setting Process

Figure 4:
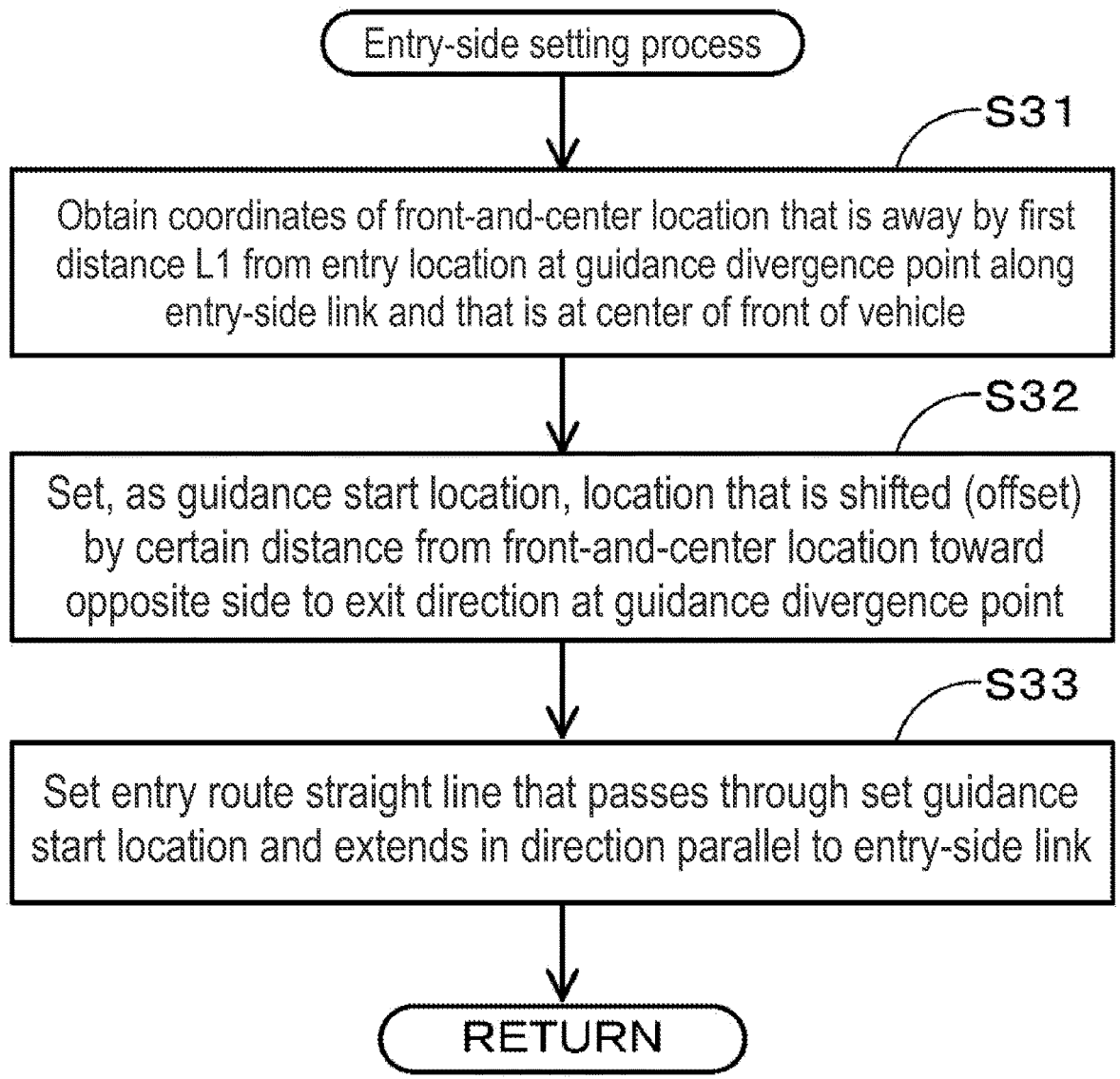
FIG. 4 is a flowchart of an entry-side setting process program which is a sub-process program for a guidance object display coordinate process.

FIG. 4 shows a flowchart of an entry-side setting process program. When the CPU 41 starts an entry-side setting process, first, at S31, the CPU 41 obtains the coordinates of a front-and-center location 68 that is away by the first distance L1 from the entry location 58 at the guidance divergence point 51 along the entry-side link 55 and that is at the front of the vehicle 52 and at the center of the vehicle 52 in a vehicle width direction. The first distance L1 is, for example, 60 m. The CPU 41 can set the front-and-center location 68 based on, for example, a current location detected by the current location detecting part 11 and the link data 32 in the map information DB 31. Note that the above-described method of setting the front-and-center location 68 is an example. For example, as the front-and-center location 68, a location may be set that is away by the first distance L1 from the entry location 58 in a direction of an entry angle θ1 at which the vehicle 52 enters the guidance divergence point 51 and that is at the front of the vehicle 52 and at the center of the vehicle 52 in the vehicle width direction. The entry angle θ1 is, for example, an angle formed by the entry-side link 55 and the exit-side link 56 which are connected to each other at a node 63 corresponding to the guidance divergence point 51. In addition, although in the example shown in FIG. 8, there are shown the entry route 53 and the exit-side link 56 which are straight roads, when at least one of the entry route 53 and the exit-side link 56 is a curved road, too, likewise, a location that is away by the first distance L1 from the entry location 58 along the entry-side link 55 and that is at the front of the vehicle 52 and at the center of the vehicle 52 in the vehicle width direction can be set as the front-and-center location 68.

Subsequently, at S32, the CPU 41 sets, as the guidance start location 59, a location that is shifted by a certain distance from the front-and-center location 68 toward the opposite side to an exit direction 65 at the guidance divergence point 51, i.e., a location that is offset by a certain distance from the front of the vehicle. Thus, the CPU 41 sets the guidance start location 59 at which a guidance object 61 is displayed, with reference to the link data 32 and the front-and-center location 68. The exit direction 65 is, for example, a direction passing through an exit location 66 and oriented along the exit-side link 56. Namely, the exit direction 65 is a direction of a portion of the exit route 54 that is connected to the guidance divergence point 51. The exit location 66 is, for example, a boundary between the guidance divergence point 51 and the exit route 54 and a location on the exit-side link 56, i.e., a location at the center of a road on the exit route 54.

The certain distance at S32 is, for example, a distance corresponding to a half-lane. In the example shown in FIG. 8, the entry route 53 is a road with one lane in each direction and a right turn is made at the guidance divergence point 51. In this case, at S32, the CPU 41 sets, as the guidance start location 59, a location shifted by a distance corresponding to a half-lane from the front-and-center location 68 in a leftward direction which is the opposite direction to the exit direction 65 (see an arrow 69 of FIG. 8). As a result, the guidance start location 59 is the location of a road edge (a road shoulder, etc.) on the left side of a travel road on which the vehicle 52 travels on the entry route 53. Thus, the certain distance at S32 is a distance that allows the guidance start location 59 having been offset, i.e., the location of a guidance object 61, to be located at an edge of a travel road on which the vehicle 52 is traveling (a travel road edge on the left side if a right turn is made at the guidance divergence point 51, and a travel road edge on the right side if a left turn is made at the guidance divergence point 51).

For example, when the entry route 53 is a road with one lane in each direction and a left turn is made at the guidance divergence point 51, the CPU 41 sets a guidance start location 59 at a location shifted by a distance corresponding to a half-lane in a rightward direction from the front-and-center location 68, i.e., on the entry-side link 55 (see a guidance start location 59A and an arrow 70 of FIG. 8). In addition, for example, when the entry route 53 is a road with two lanes in each direction, the vehicle 52 travels in a second lane (passing lane), and a right turn is made at the guidance divergence point 51, the CPU 41 sets a guidance start location 59 at a travel road edge on the left side of the second lane. In addition, for example, when the entry route 53 is a road with two lanes in each direction, the vehicle 52 travels in a second lane (passing lane), and a left turn is made at the guidance divergence point 51, the CPU 41 sets a guidance start location 59 on the right side of the second lane, i.e., on the entry-side link 55 (on a median strip). In addition, for example, when the entry route 53 is a road with two lanes in each direction, the vehicle 52 travels in a first lane, and a right turn is made at the guidance divergence point 51, the CPU 41 sets a guidance start location 59 at a travel road edge (a roadside, a side strip, etc.) on the left side of the first lane. Note that the certain distance at S32 is not limited to the distance corresponding to a half-lane and may be, for example, a distance corresponding to one lane or may be a distance determined based on the number of lanes as with the exit route 54 which will be described later.

Subsequently, at S33, the CPU 41 sets an entry route straight line 71 which is a straight line that passes through the guidance start location 59 set at S32 and extends in a direction parallel to the entry-side link 55. The CPU 41 sets the entry route straight line 71, for example, based on the link data 32. The entry route straight line 71 is a straight line extending along the entry route 53, i.e., along a course whose guidance is provided. When the CPU 41 has performed S33, the CPU 41 ends the process shown in FIG. 4. Note that the entry route straight line 71 may be set so as to extend from the guidance start location 59 along the entry angle θ1.

Exit-Side Setting Process

Figure 5:
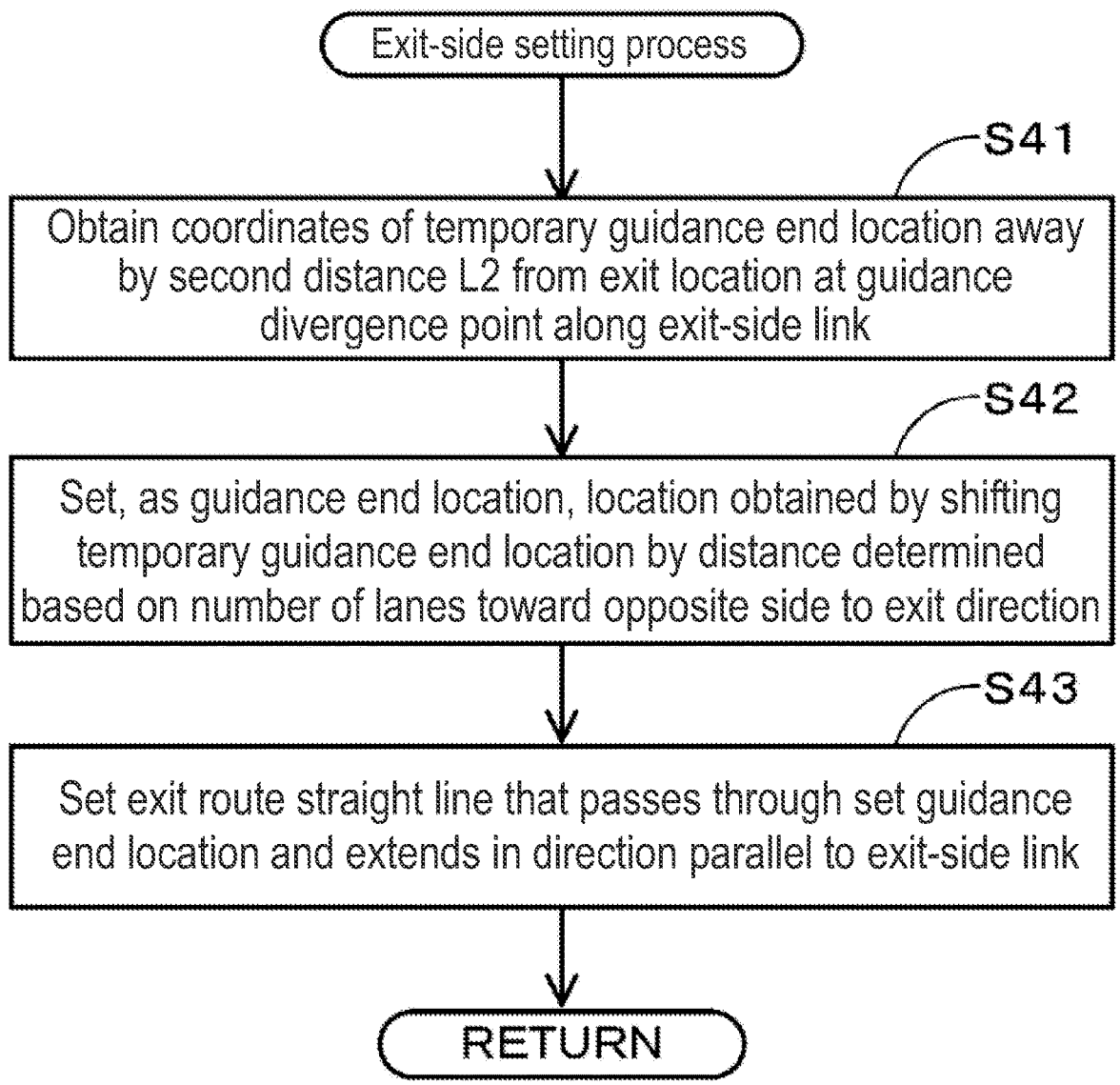
FIG. 5 is a flowchart of an exit-side setting process program which is a sub-process program for the guidance object display coordinate process.

Subsequently, as shown in FIG. 3, when the CPU 41 has performed the entry-side setting process at S21, the CPU 41 performs an exit-side setting process at S22. FIG. 5 shows a flowchart of an exit-side setting process program. Note that in the following description, description of the same operations as those of the above-described entry-side setting process is omitted as appropriate. When the CPU 41 starts the exit-side setting process, first, at S41, the CPU 41 sets, as a temporary guidance end location 73A, a location on the exit-side link 56 away by a second distance L2 from the exit location 66 at the guidance divergence point 51 along the exit-side link 56, and obtains the coordinates of the temporary guidance end location 73A. The second distance L2 is, for example, 40 m. Note that the second distance L2 may be identical to the first distance L1 or may be a distance longer than the first distance L1.

Subsequently, at S42, the CPU 41 sets, as a guidance end location 73, a location obtained by shifting the temporary guidance end location 73A by a distance determined based on the number of lanes toward the opposite side to the exit direction 65. As described above, in the present embodiment, a link is set at a center location of a road. Hence, the guidance end location 73 is a location obtained by shifting the temporary guidance end location 73A from the center of the road on the exit route 54 by a distance determined based on the number of lanes in which the vehicle 52 travels on the exit route 54, i.e., a distance determined based on the number of travel lanes on a course whose guidance is provided. In addition, as shown in FIG. 8, when a right turn is made at the guidance divergence point 51, a direction in which a right turn is made is the exit direction 65, and the opposite side to the exit direction 65 indicates a location on the left side of the vehicle 52. In other words, for the vehicle 52 traveling along a course whose guidance is provided, the opposite side to the exit direction 65 is a location on the left side when a right turn is made, and is a location on the right side when a left turn is made.

In the example shown in FIG. 8, the number of travel lanes on the exit route 54 whose guidance is provided is two. Hence, at S42, the CPU 41 sets, as the guidance end location 73, a location obtained by shifting the temporary guidance end location 73A present at the center of the road on the exit route 54 by a distance corresponding to two lanes toward a travel road side of the exit route 54 whose guidance is provided to the vehicle 52. The guidance end location 73 is a location on a roadside (a side strip, etc.) on the left side of a travel road on the exit route 54 whose guidance is planned to be provided to the vehicle 52. In other words, the guidance end location 73 is a location shifted by a distance corresponding to the number of lanes on the course from the center of the road on the exit route 54 toward a course side (see an arrow 75 of FIG. 8). Note that the distance by which the temporary guidance end location 73A is shifted is not limited to two lanes and may be, for example, one lane (half of travel lanes). In addition, the above-described method of setting the guidance end location 73 may be performed for the above-described guidance start location 59, and the method of setting the guidance start location 59 may be performed for the guidance end location 73.

Subsequently, at S43, the CPU 41 sets an exit route straight line 77 which is a straight line that passes through the guidance end location 73 set at S42 and extends in a direction parallel to the exit-side link 56. The exit route straight line 77 is a straight line extending along the exit route 54, i.e., along a course whose guidance is provided. When the CPU 41 has performed S43, the CPU 41 ends the process shown in FIG. 5.

Intra-Divergence Point Setting Process

Figure 6:
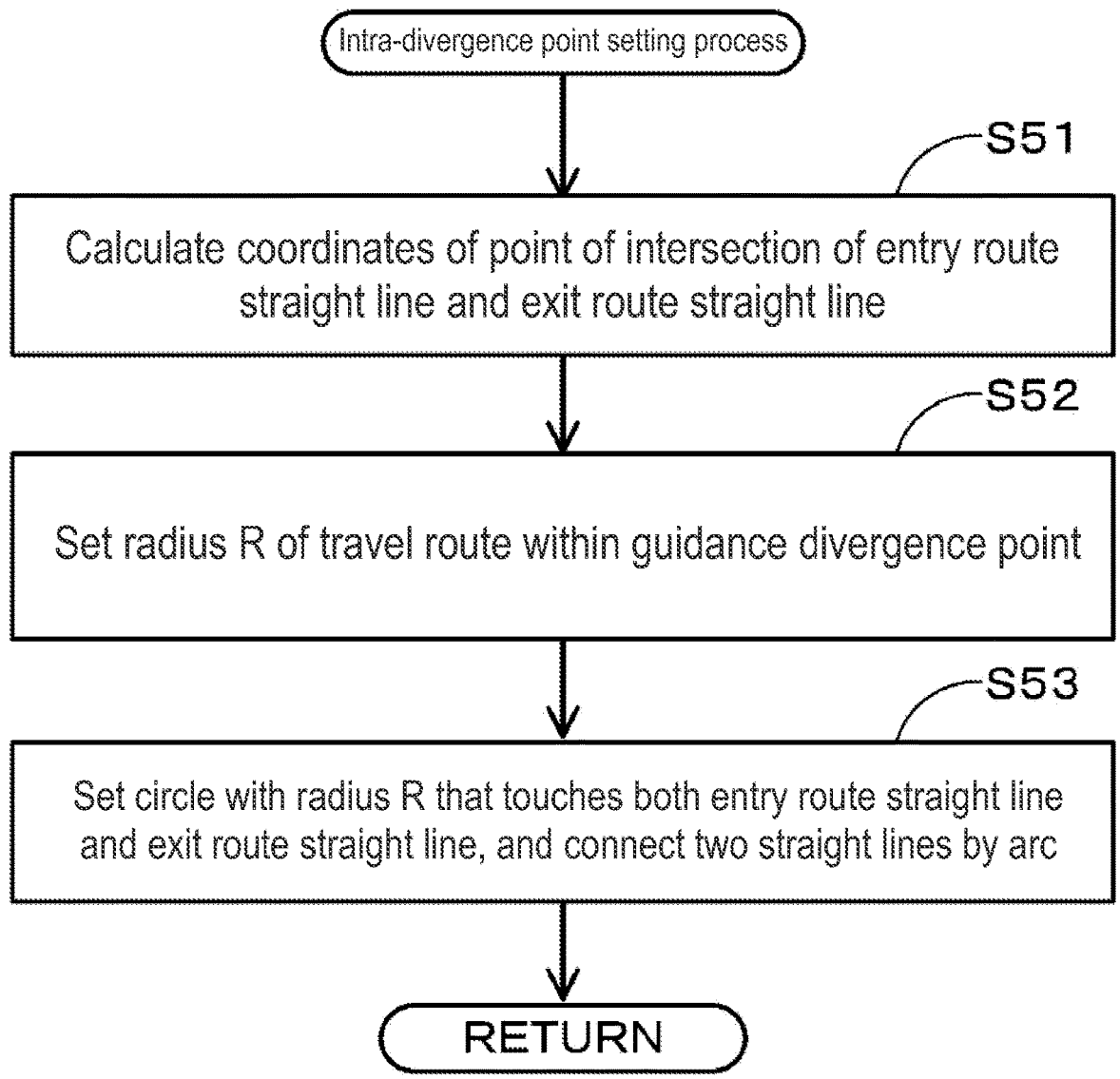
FIG. 6 is a flowchart of an intra-divergence point setting process program which is a sub-process program for the guidance object display coordinate process.

As shown in FIG. 3, when the CPU 41 has performed the exit-side setting process at S22, at S23, the CPU 41 performs an intra-divergence point setting process. FIG. 6 shows a flowchart of an intra-divergence point setting process program. When the CPU 41 starts the intra-divergence point setting process, first, at S51, the CPU 41 calculates the coordinates of a point of intersection 81 of the entry route straight line 71 set at S33 of the entry-side setting process shown in FIG. 4 and the exit route straight line 77 set at S43 of FIG. 5 (see FIG. 8). The point of intersection 81 is a point of intersection of straight lines obtained by extending the entry route straight line 71 and the exit route straight line 77 toward a guidance divergence point 51 side.

Subsequently, at S52, the CPU 41 sets a radius R of a travel route within the guidance divergence point 51. For example, as indicated by an arrow 83 of FIG. 8, the CPU 41 sets a guidance route that passes through the guidance divergence point 51 from the entry route 53 and enters a first lane of the exit route 54. The CPU 41 sets the guidance route based on, for example, the number of lanes (link data 32) and the configuration of a divergence point (divergence point data 34) in the map information DB 31. The CPU 41 calculates a radius of the set guidance route and sets the calculated radius as a radius R. Note that the above-described method of setting the radius R is an example. For example, the CPU 41 may set the radius R based on an angle (entry angel θ1) formed by the entry route 53 and the exit-side link 56. For example, the radius R may increase as the entry angle θ1 increases.

Figure 9:
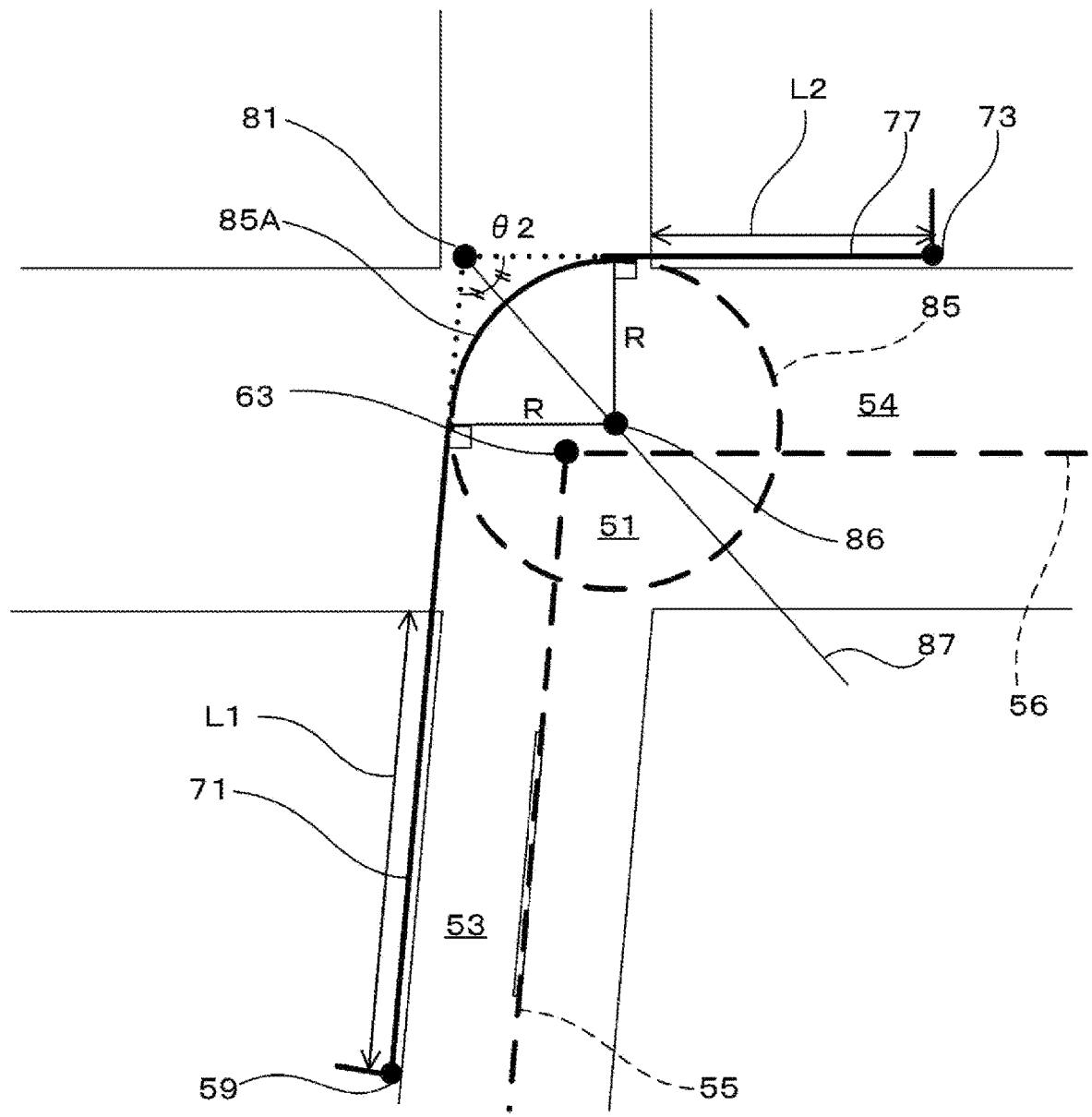
FIG. 9 is a diagram for describing an intra-divergence point setting process.

Subsequently, at S53, the CPU 41 sets a circle with the radius R that touches both the entry route straight line 71 and the exit route straight line 77, and connects the two straight lines by an arc with the radius R. FIG. 9 is a diagram for describing operations performed in the intra-divergence point setting process, and depiction of the vehicle 52, a median strip on the exit route 54, etc., shown in FIG. 8 is omitted. As shown in FIG. 9, for example, a center 86 of a circle 85 (perfect circle) that touches the entry route straight line 71 and the exit route straight line 77 is on a bisector 87 of an angle θ2 formed by the entry route straight line 71 and the exit route straight line 77. The CPU 41, for example, sets the bisector 87 based on the coordinates of the point of intersection 81 and the angle θ2 and calculates, as the coordinates of the center 86, coordinates on the bisector 87 at which a distance between the entry route straight line 71 and the exit route straight line 77 is the radius R. The CPU 41 sets the circle 85 based on the calculated center 86 and the radius R, and calculates the coordinates of an arc 85A that connects together points of contact of the respective entry route straight line 71 and exit route straight line 77 (a solid-line portion of the circle 85 of FIG. 9). By this, coordinates at which the entry route straight line 71 and the exit route straight line 77 are connected together by the arc 85A which is a part of the circle 85 can be obtained. When the CPU 41 has performed S53, the CPU 41 ends the process shown in FIG. 6.

Coordinate Setting Process

Figure 7:
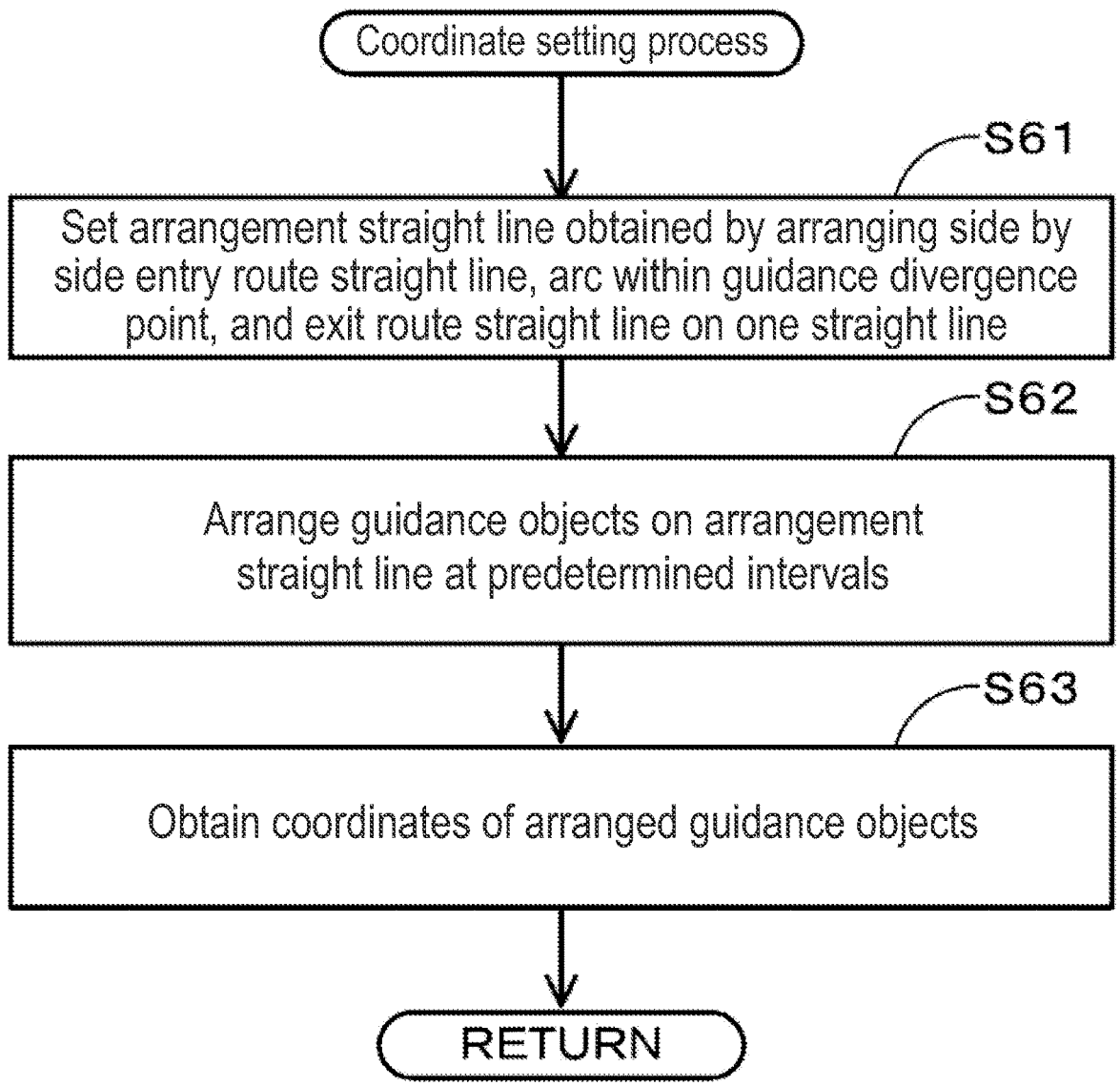
FIG. 7 is a flowchart of a coordinate setting process program which is a sub-process program for the guidance object display coordinate process.
Figure 10:
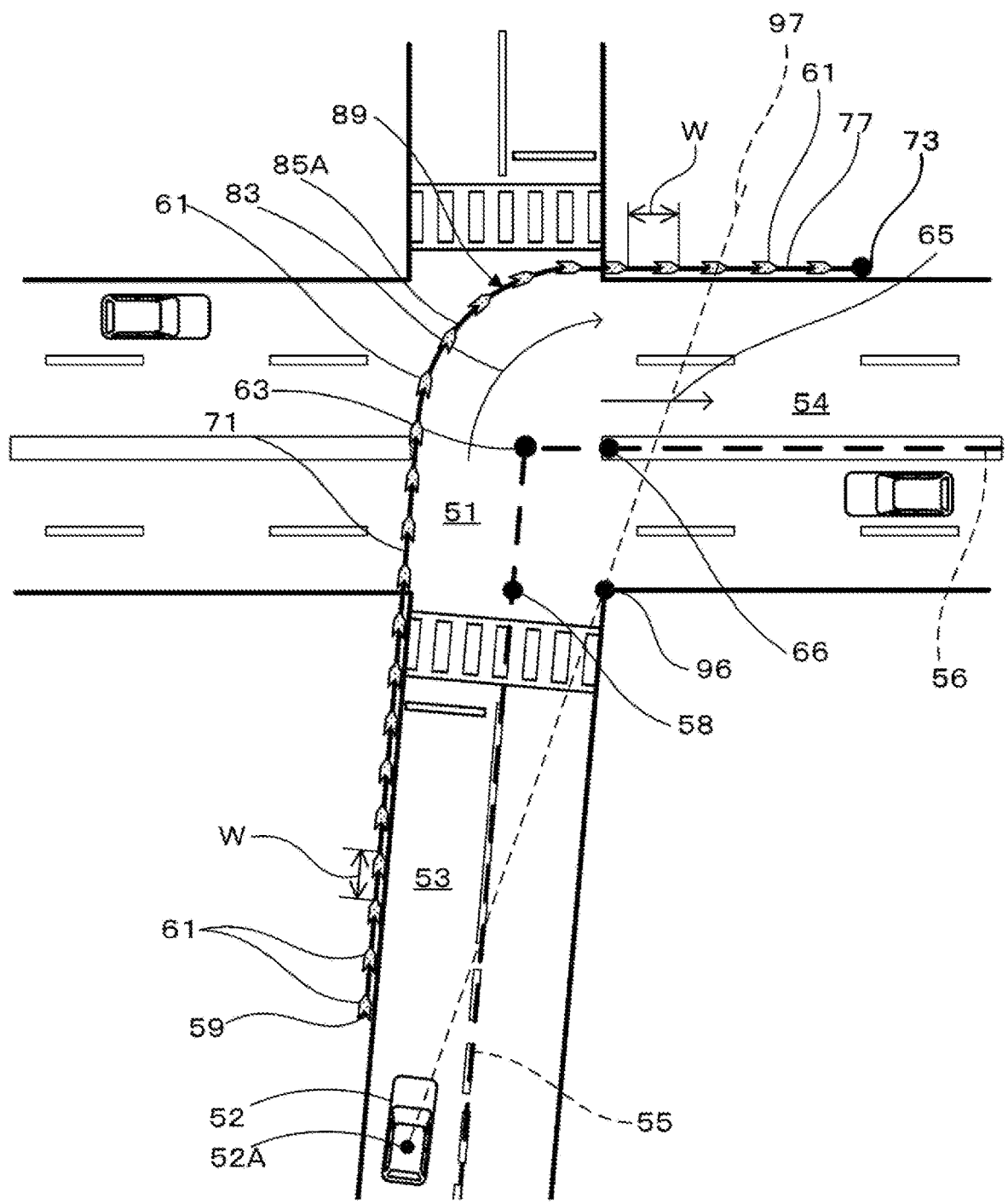
FIG. 10 is a diagram showing a state in which guidance objects are arranged.

As shown in FIG. 3, when the CPU 41 has performed the intra-divergence point setting process at S23, at S24, the CPU 41 performs a coordinate setting process. FIG. 7 shows a flowchart of a coordinate setting process program. When the CPU 41 starts the coordinate setting process, first, at S61, the CPU 41 sets an arrangement straight line 89 which is a straight line obtained by arranging side by side the entry route straight line 71 set at S33 of FIG. 4, the arc 85A set at S53 of FIG. 6, and the exit route straight line 77 set at S43 of FIG. 5 on one straight line (see FIG. 10). As shown in FIG. 10, the arrangement straight line 89 is curved in a rightward direction so as to follow a course of a guidance route whose guidance is provided to the occupant of the vehicle 52, i.e., a course where a right turn is made at the guidance divergence point 51. In addition, the arrangement straight line 89 is present at a location shifted by a distance corresponding to one lane from the entry-side link 55 toward the left on the entry route 53, in other words, shifted by a distance corresponding to a half-lane from the front-and-center location 68 of the vehicle 52 toward the left (see FIG. 8). In addition, within the guidance divergence point 51, the arrangement straight line 89 is present at a location shifted toward the left side (outer side) relative to a guidance route on which the vehicle 52 is planned to travel. In addition, the arrangement straight line 89 is present at a location shifted by a distance corresponding to the number of travel lanes (e.g., two lanes) from the exit-side link 56 (at the center of the road) toward the left side (outer side) on the exit route 54.

Subsequently, at S62, the CPU 41 arranges guidance objects 61 on the arrangement straight line 89 set at S61 at predetermined intervals. As shown in FIG. 10, the CPU 41 arranges, for example, a plurality of guidance objects 61 in turn on the arrangement straight line 89 from the guidance start location 59 at equal intervals W. The intervals W are, for example, 3 m. Note that instead of arranging a plurality of guidance objects 61 at regular intervals, the plurality of guidance objects 61 may be arranged at irregular intervals. For example, the CPU 41 may set relatively narrow intervals W for a straight line and set relatively wide intervals W for a curve (within the guidance divergence point 51, etc.).

Subsequently, at S63, the CPU 41 obtains the coordinates of each of the plurality of guidance objects 61 arranged at S62. The CPU 41, for example, stores information on the obtained coordinates of the plurality of guidance objects 61 in the ROM 43 or the flash memory 44. The CPU 41 displays the guidance objects 61 on the liquid crystal display 15 in a superimposed manner, based on the coordinates of the guidance objects 61 obtained at the S63. When the CPU 41 has performed S63, the CPU 41 ends the process shown in FIG. 7.

Figure 2:
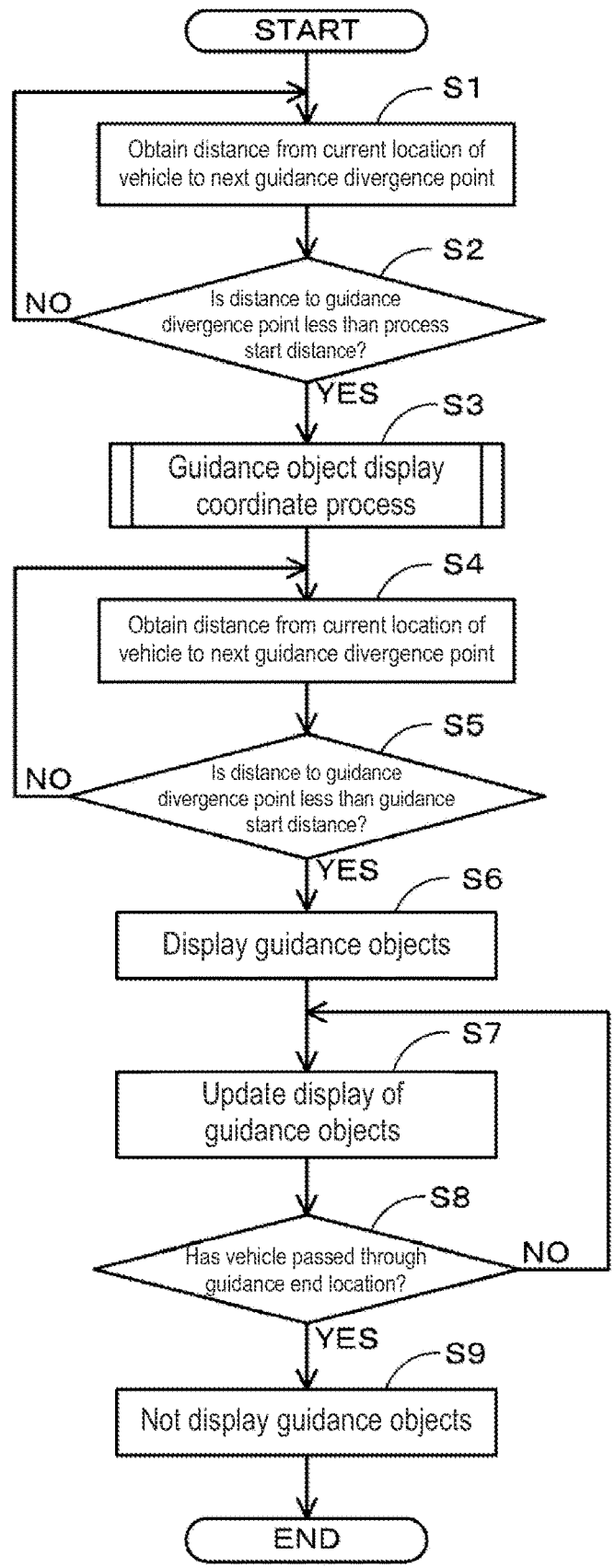
FIG. 2 is a flowchart of a travel assistance process program according to the first embodiment.

Subsequently, as shown in FIGS. 2 and 3, when the CPU 41 has performed the guidance object display coordinate process at S3, at S4, the CPU 41 obtains a distance from a current location of the vehicle 52 to the guidance divergence point 51. The CPU 41 determines whether the distance obtained at S4 is less than a guidance start distance (S5). The guidance start distance is a threshold value for determining the timing of starting display of the guidance objects 61. When the host vehicle approaches the guidance start distance from the guidance divergence point 51, the CPU 41 starts a process of displaying the guidance objects 61. For the guidance start distance, for example, the first distance L1 can be adopted. In this case, when the vehicle 52 reaches the guidance start location 59, the CPU 41 starts display of the guidance objects 61. Alternatively, the guidance start distance may be a distance longer than the first distance L1, e.g., a distance corresponding to a location where the occupant can see the first guidance object 61 on his/her forward left. Alternatively, the guidance start distance may be a distance shorter than the first distance L1.

While the CPU 41 determines that the distance from a current location to the guidance divergence point 51 is greater than or equal to the guidance start distance (S5: NO), the CPU 41 repeatedly performs the processes at S4 and S5. If the CPU 41 determines that the distance from a current location to the guidance divergence point 51 is less than the guidance start distance (S5: YES), then at S6, the CPU 41 starts display of the guidance objects 61. The CPU 41 transmits a control signal to the liquid crystal display 15 to allow the liquid crystal display 15 to display images of the guidance objects 61. The CPU 41 displays the guidance objects 61 such that the guidance objects 61 are superimposed on a captured image that is captured by the front camera 19 (see FIG. 1), i.e., a view (actual view image) around the vehicle (particularly, ahead of the vehicle) at the present time, based on the locations determined at S63 of FIG. 7.

A method of displaying images of the guidance objects 61 such that the images are superimposed on an actual view image is not particularly limited. For example, the CPU 41 creates three-dimensional space corresponding to an area around a current location of the vehicle 52 (particularly, an area ahead in a traveling direction). The CPU 41 creates, as the three-dimensional space, space in which only road surfaces are set. Note that the CPU 41 may, for example, model roads such as the entry route 53, the guidance divergence point 51, and the exit route 54 in three-dimensional space, based on the map information DB 31. Alternatively, the CPU 41 may also model buildings, road signs, etc., in addition to roads in three-dimensional space. In addition, information on three-dimensional space may be stored in advance as three-dimensional map information in the map information DB 31, and the CPU 41 may read a corresponding piece of three-dimensional map information of an area around the host vehicle location from the map information DB 31 and use the read three-dimensional map information. In addition, the CPU 41 may create three-dimensional space based on an image captured by the front camera 19. For example, by performing point cloud matching on a captured image that is captured by the front camera 19, roads and structures around the roads are detected, by which three-dimensional space can be created.

Figure 11:
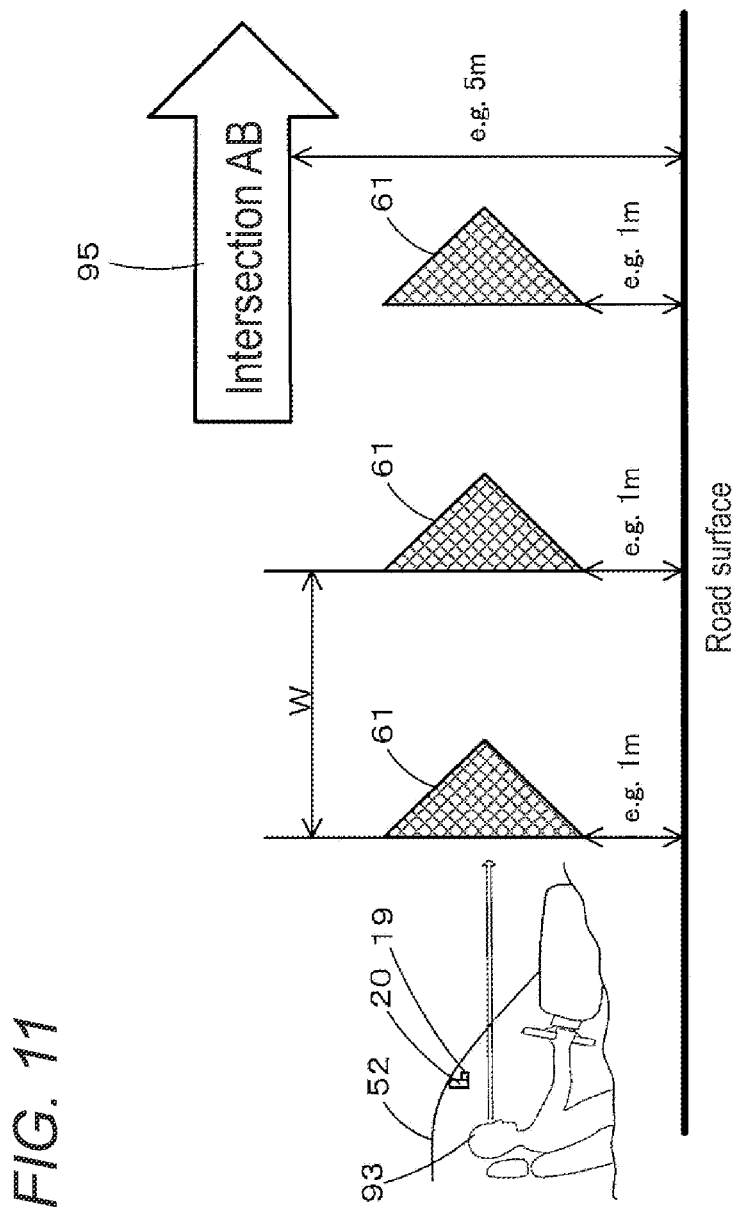
FIG. 11 is a diagram for describing locations at which guidance objects are arranged.

The CPU 41 identifies the current location and orientation of the host vehicle in the created three-dimensional space, based on parameters detected by the current location detecting part 11. For example, the location of the front camera 19 installed on the vehicle 52 is the current location of the host vehicle, and an optical-axis direction of the front camera 19 is the orientation of the host vehicle. By the location of the vehicle 52 being the location of the front camera 19, when guidance objects 61 are arranged in the three-dimensional space, a captured image is an image that can be visually identified when the guidance objects 61 are visually identified in a traveling direction of the vehicle 52 from a point of view of the front camera 19. As shown in FIG. 11, the front camera 19 is mounted on, for example, the backside of the rearview minor 20. Hence, the location of the front camera 19 corresponds to a location corresponding to the elevation of the line of sight of an occupant 93 of the vehicle 52, i.e., the optical-axis direction of the front camera 19 also corresponds to the line-of-sight direction of the occupant 93 of the vehicle 52. In addition, a captured image that is captured by the front camera 19 corresponds to an image viewed (visually identified) from the field of vision of the occupant 93 of the vehicle 52.

In addition, the CPU 41, for example, creates two-dimensional polygons as guidance objects 61, and creates objects that basically do not have thickness. Note, however, that three-dimensional polygons having thickness may be used. The CPU 41 arranges the created two-dimensional polygons of guidance objects 61 in the three-dimensional space, based on the current location and orientation of the host vehicle (front camera 19) in the three-dimensional space and the coordinates obtained at S63 of FIG. 7. In addition, as shown in FIG. 11, the CPU 41 arranges a plurality of guidance objects 61 such that the guidance objects 61 match the elevation of the line of sight of the occupant 93. Specifically, the guidance objects 61 each form, for example, a triangular shape whose plane is present in a direction perpendicular to a road surface. The plurality of guidance objects 61 are arranged such that one base is disposed on a vehicle 52 side and a vertex opposite the base is disposed so as to face the end of the course, to indicate a course of the vehicle 52. In the present embodiment, the base on the vehicle 52 side of the guidance object 61 is present in the direction perpendicular to the road surface.

The CPU 41 arranges each of the plurality of guidance objects 61 having a triangular shape at a location with a predetermined height (e.g., 1 m) from a road surface in the three-dimensional space. The predetermined height has a value set based on the type, vehicle height, etc., of the vehicle 52, and is a location corresponding to a height determined based on the elevation of the line of sight of the occupant 93. By this, the guidance objects 61 can be arranged at locations corresponding to the elevation of the line of sight of the occupant 93. Note that the value of height at which the guidance objects 61 are arranged may be accepted from the occupant 93. By this, with the occupant 93 checking display performed on the liquid crystal display 15, the display locations of the guidance objects 61 can be changed to desired height. Alternatively, the CPU 41 may detect the elevation of the line of sight of the occupant 93 based on an image captured by an in-vehicle camera, etc., and allow the height at which the guidance objects 61 are displayed to match the actual elevation of the line of sight of the occupant 93.

The CPU 41 obtains an image (hereinafter, referred to as visually identified image) in which the three-dimensional space having the plurality of guidance objects 61 arranged therein is visually identified in a traveling direction of the vehicle 52 from an identified location of the vehicle 52 (the location of the front camera 19 corresponding to a point of view). Particularly, the location of the vehicle 52 is the location of the front camera 19, and thus, the obtained visually identified image is an image that can be visually identified when each of the guidance objects 61 arranged in the three-dimensional space is visually identified in the traveling direction of the vehicle 52 from the point of view of the front camera 19, but the obtained visually identified image also corresponds to the field of vision of the occupant 93 of the vehicle 52. The CPU 41 stores the shapes and locations of guidance objects 61 included in the visually identified image as the shapes and locations of guidance objects 61 to be displayed on the liquid crystal display 15. The shapes of guidance objects 61 stored here are the shapes of guidance objects 61 that can be visually identified when visually identified from the point of view of the vehicle 52 (more precisely, the front camera 19) among the guidance objects 61 arranged in the three-dimensional space. In addition, the stored locations of guidance objects 61 are the locations of guidance objects 61 that can be visually identified when visually identified from the point of view of the vehicle 52 (more precisely, the front camera 19) among the guidance objects 61 arranged in the three-dimensional space. Then, the CPU 41 allows the liquid crystal display 15 to display an image in which the guidance objects 61 are displayed superimposed on a view captured by the front camera 19, based on the stored shapes and locations of the guidance objects 61. By this, of the guidance objects 61 arranged in the three-dimensional space, guidance objects 61 that can be visually identified from the occupant 93 at the current location are reflected on the liquid crystal display 15.

Figure 12:
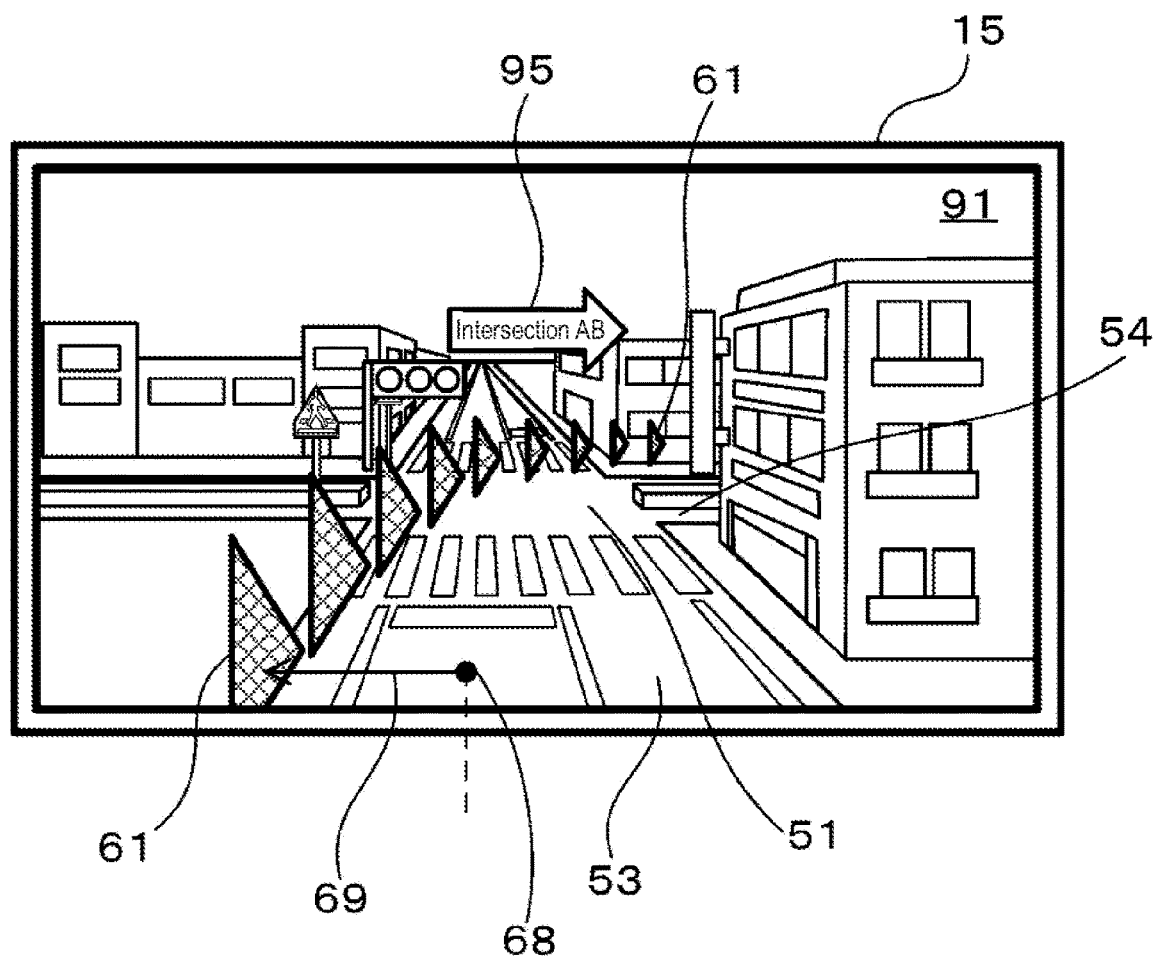
FIG. 12 is a diagram showing an example of a travel guidance screen displayed on a liquid crystal display.

FIG. 12 shows an example of a travel guidance screen displayed on the liquid crystal display 15 and showing that the vehicle 52 has approached the guidance divergence point 51 (before entry). As shown in FIG. 12, images of a plurality of guidance objects 61 are displayed on the liquid crystal display 15 such that the images are superimposed on a view 91 ahead of the vehicle 52 at the present time that is captured by the front camera 19. As shown in FIGS. 11 and 12, the plurality of guidance objects 61 are arranged at locations with the intervals W along the arrangement straight line 89 (see FIG. 10). In addition, a plurality of guidance objects 61 arranged from the guidance start location 59 (see FIG. 10) to an entrance to the guidance divergence point 51 are arranged along the travel road edge on the left side of the entry route 53, and the orientation of each of the guidance objects 61 also indicates a direction in which the vehicle 52 travels straight ahead on the entry route 53 and enters the guidance divergence point 51. This can suggest the occupant that there is still a long distance to the guidance divergence point 51 ahead in the traveling direction. In addition, as described above, the guidance objects 61 arranged along the travel road edge of the entry route 53 are displayed at locations shifted by a distance corresponding to a half-lane in the vehicle width direction from the front-and-center location 68 of the vehicle 52 toward the left side (the opposite side to the exit direction) (see the arrow 69 of FIG. 12). By this, even if a plurality of guidance objects 61 are displayed so as to match the elevation of the line of sight of the occupant 93, guidance objects 61 displayed farther away are displayed at locations shifted from guidance objects 61 present on a vehicle 52 side in a traveling direction (in a case of FIG. 12, the right side), suppressing the guidance objects 61 from overlapping other guidance objects 61. In addition, some of a plurality of guidance objects 61 arranged within the guidance divergence point 51 are arranged along the arc 85A (see FIG. 10) and indicate the exit route 54. By this, a course taken after entering the guidance divergence point 51 can be suggested to the occupant 93.

Note that as shown in FIG. 12, the CPU 41 may display an image of a guidance object other than the guidance objects 61. For example, the CPU 41 may display a guidance object 95 of an arrow indicating a traveling direction and the name of an intersection on the liquid crystal display 15, in addition to the guidance objects 61. The CPU 41 displays the guidance object 95, for example, at a location higher than guidance objects 61 present at the guidance divergence point 51 (e.g., 5 m high) so that the guidance object 95 is displayed not overlapping the guidance objects 61 (see FIG. 12).

The CPU 41 may, for example, set a display area of guidance objects 61 and not display guidance objects 61 present outside the area. Specifically, as shown in FIG. 10, the CPU 41 sets a straight line 97 that connects a center 52A of the host vehicle at a current location to a corner 96 of a road present on a vehicle 52 side on a course in a traveling direction (in this case, the exit route 54 in a right-turn direction). The CPU 41 may not display guidance objects 61 included in an area farther away in the traveling direction than the straight line 97 (in a case of FIG. 10, the right side). Alternatively, in the above-described modeling of three-dimensional space, the CPU 41 may obtain information on structures, etc., from the map information DB 31, the front camera 19, etc., and not display guidance objects 61 overlapping (present behind) the structures, etc., or a part of the guidance objects 61. This suppresses the occurrence of a situation in which a guidance object 61 that is planned to be disposed behind as coordinates is displayed before a structure, etc., enabling suppression of the occurrence of erroneous recognition of a course indicated by guidance objects 61.

Subsequently, when the CPU 41 has performed S6 of FIG. 2, at S7, the CPU 41 performs the above-described display process at S6 in accordance with traveling of the vehicle 52, to update display of guidance objects 61 according to the current location. Subsequently, the CPU 41 determines whether the vehicle 52 has passed through the guidance end location 73 which is an end location of an area in which the guidance objects 61 are displayed (S8), and during a period before the vehicle 52 passes through the guidance end location 73 (S8: NO), the CPU 41 performs the process at S7 to update guidance objects 61 to be displayed.

Figure 13:
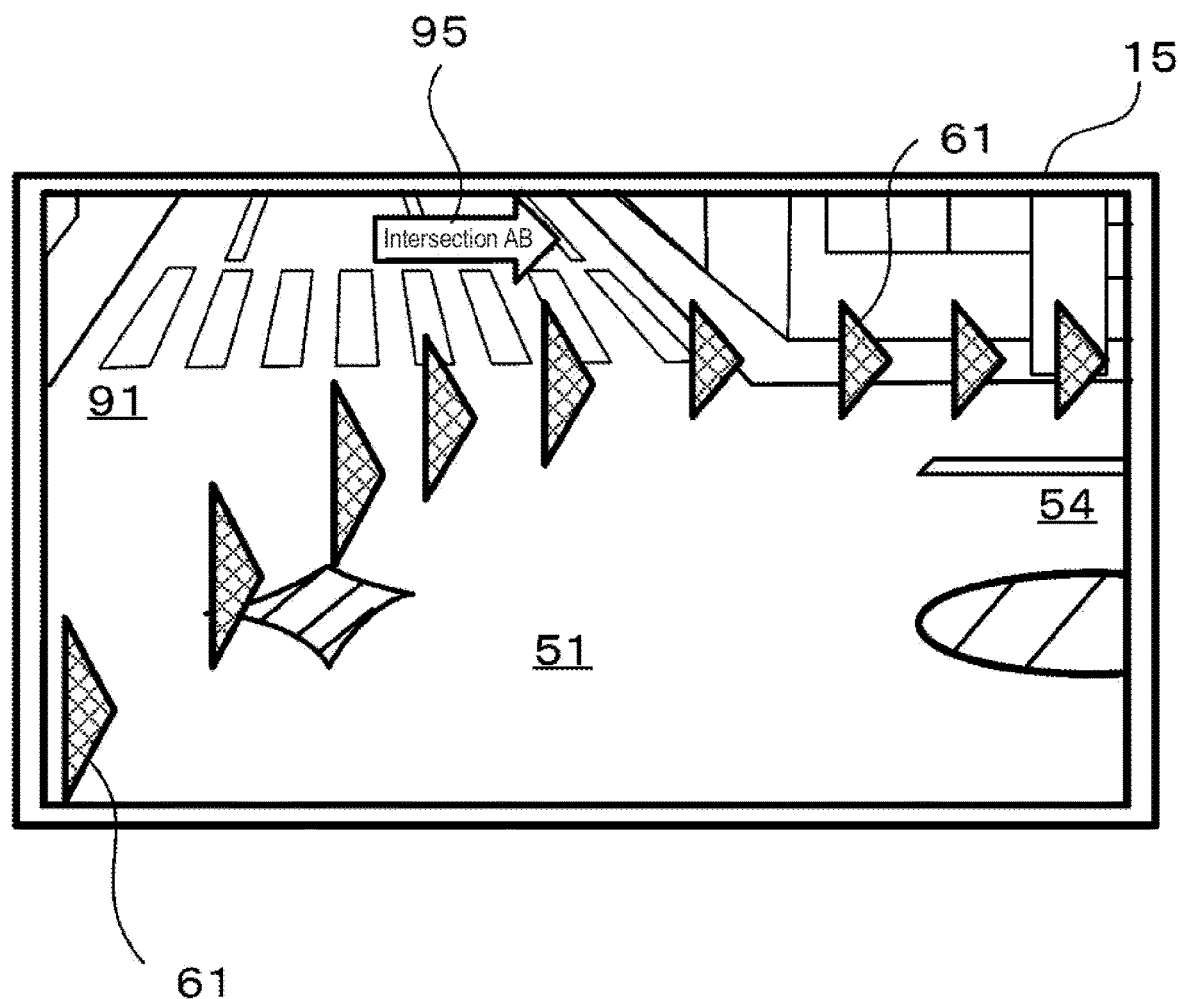
FIG. 13 is a diagram showing an example of a travel guidance screen displayed on the liquid crystal display.

FIG. 13 shows the liquid crystal display 15 displaying images of guidance objects 61 within the guidance divergence point 51. As shown in FIG. 13, a plurality of guidance objects 61 are arranged at locations with the intervals W along the arc 85A (see FIG. 10) within the guidance divergence point 51, and indicate a direction in which the vehicle 52 enters the exit route 54. Thus, by displaying the guidance objects 61 in a direction of a course whose guidance is provided (see the arrow 83 of FIG. 10) and arranging the guidance objects 61 on an outer side of a guidance route, the occupant 93 can more easily recognize the course.

Figure 14:
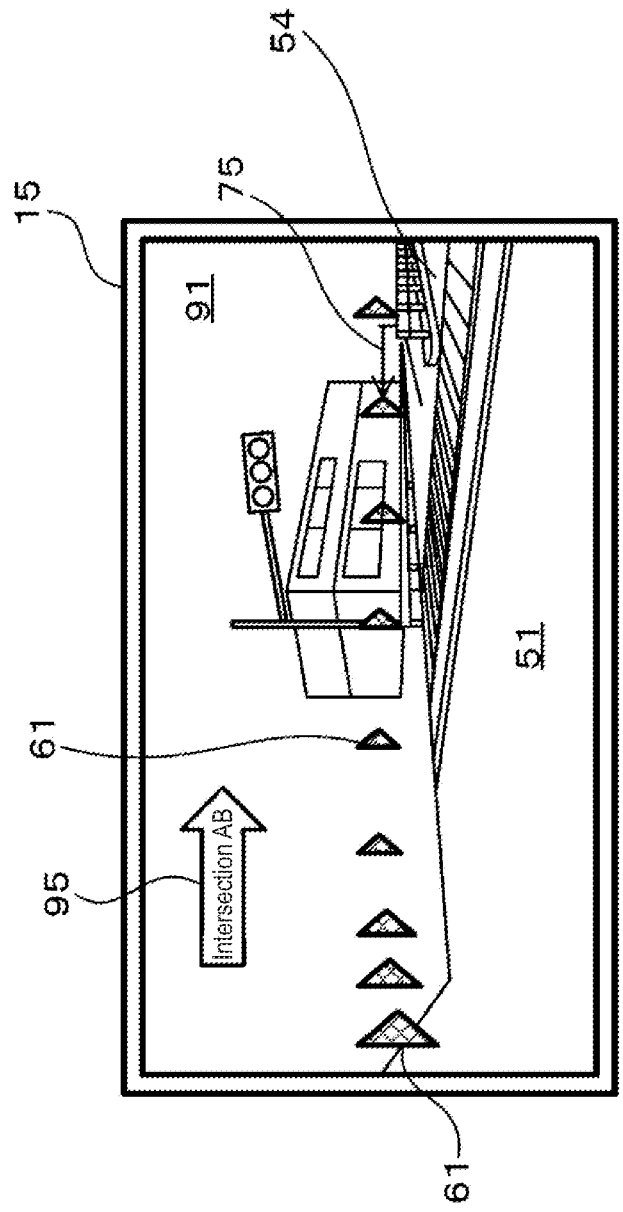
FIG. 14 is a diagram showing an example of a travel guidance screen displayed on the liquid crystal display.

In addition, FIG. 14 shows the liquid crystal display 15 displaying images of guidance objects 61 in a state of having approached the exit route 54. As shown in FIG. 14, a plurality of guidance objects 61 are arranged along a travel road edge (a road shoulder, a guardrail, etc.) in the first lane of the exit route 54 at the intervals W from within the guidance divergence point 51, indicating a course of the vehicle 52 ahead of a right turn. By this, the occupant 93 can more easily recognize a lane to enter after the right turn. In addition, in the exit route 54, a plurality of guidance objects 61 are displayed at locations shifted by a distance corresponding to the number of lanes (in the present embodiment, a distance corresponding to two lanes) on the course from the center of the road on the exit route 54 toward a course side (see the arrow 75 of FIG. 14). By this, even if a plurality of guidance objects 61 are displayed so as to match the elevation of the line of sight of the occupant 93, guidance objects 61 displayed farther away on the exit route 54 are displayed at locations shifted from guidance objects 61 present on a vehicle 52 side in a traveling direction (in a case of FIG. 14, more right side), suppressing the guidance objects 61 from overlapping other guidance objects 61.

Then, if the CPU 41 determines that the vehicle 52 has entered the exit route 54 and a current location of the vehicle 52 has passed through the guidance end location 73 (S8: YES), then the CPU 41 ends the process of displaying the guidance objects 61 (S9). When the CPU 41 has performed S9 and ended the processes shown in FIG. 2, the CPU 41 performs again processes from S1 of FIG. 2. The CPU 41 performs again the above-described process of displaying guidance objects 61 when the vehicle 52 approaches a next guidance divergence point 51. By this, in travel route guidance, guidance objects 61 are displayed for each guidance divergence point 51, and guidance on a course can be provided to the occupant 93.

For information, the navigation device 1 is an example of a superimposed-image display device. The CPU 41 is an example of object displaying means. The map information DB 31 is an example of map information. The front-and-center location 68 is an example of a center.

As described in detail above, according to the navigation device 1 according to the first embodiment and a computer program executed by the navigation device 1, when there is a guidance divergence point, which is a guidance target, ahead in a traveling direction of the vehicle, a plurality of guidance objects that provide guidance on an entry route that enters the guidance divergence point and an exit route that exits from the guidance divergence point are displayed (S6 and S7). A course including the entry route, the guidance divergence point, and the exit route is displayed using a plurality of guidance objects, and the plurality of guidance objects are displayed so as to match the elevation of the line of sight of the occupant of the vehicle and displayed so as to be shifted to locations that are on the opposite side to an exit direction at the guidance divergence point relative to the front of the vehicle (FIG. 12). By arranging the guidance objects at locations shifted toward the opposite side to the exit direction from the front of the vehicle, even if a plurality of guidance objects are displayed along the course and at locations corresponding to the elevation of the line of sight of the occupant, the plurality of guidance objects can be suppressed from overlapping each other.

In addition, in the entry route, a plurality of guidance objects are displayed at locations shifted by a certain distance from the center of the vehicle in the vehicle width direction. In such a processing method, a process of shifting guidance objects can be uniformly performed using the certain distance, by which processing operations are simplified, enabling a reduction in processing load. In addition, in the exit route, a plurality of guidance objects are displayed at locations shifted by a distance determined based on the number of lanes on the exit route from the center of a road on the exit route, and thus, the guidance objects are shifted by the distance determined based on the number of lanes, and the occupant can recognize a difference in the number of travel lanes on the exit route by the shift in locations of the guidance objects.

In addition, in the entry route, a plurality of guidance objects are displayed at locations shifted by a distance corresponding to a half-lane from the front of the vehicle and the center of the vehicle in the vehicle width direction toward the opposite side to the exit direction. Guidance on the course can be provided to the occupant by displaying the guidance objects on a side of the vehicle. In addition, in the exit route, a plurality of guidance objects are displayed at locations shifted by a distance corresponding to the number of lanes on the course from the center of the road on the exit route toward a course side. By this, the guidance objects are displayed at a travel road edge (road edge) on the exit route, and a boundary of the road on the exit route (a boundary between the road and a sidewalk, etc.) can be indicated by the guidance objects. In addition, when there are a plurality of lanes on the exit route, the occupant can recognize the location of a first lane.

In addition, a circle that touches two straight lines, an entry route straight line which is a straight line extending along the course on the entry route and an exit route straight line which is a straight line extending along the course on the exit route, is set and within the guidance divergence point, a plurality of guidance objects are displayed side by side along the circle. By this, guidance on the course within the guidance divergence point can be provided by the guidance objects arranged along an arc. The occupant can be prompted to make a smoother change of direction.

In addition, a process of displaying a plurality of guidance objects such that the guidance objects are shifted to locations that are on the opposite side to the exit direction relative to the front of the vehicle is performed with reference to links in map information. By this, a process of shifting locations at which guidance objects are displayed can be performed with reference to road link information set in the map information. By referring to the links, a display mode of guidance objects for each road can be made to be a display mode with a sense of unity.

Second Embodiment

Next, a superimposed-image display device according to a second embodiment will be described based on FIGS. 15 and 16. Note that in the following description, the same reference signs as those of components of the superimposed-image display device according to the first embodiment in the above-described FIGS. 1 to 14 indicate the same portions as or corresponding portions to components of the superimposed-image display device, etc., according to the first embodiment.

A schematic configuration of the superimposed-image display device according to the second embodiment is substantially the same as that of the superimposed-image display device according to the first embodiment. In addition, various control processes are also substantially the same as those of the superimposed-image display device according to the first embodiment.

Note, however, that the superimposed-image display device according to the second embodiment differs from the superimposed-image display device according to the first embodiment in that the superimposed-image display device according to the first embodiment displays a captured image that is captured by the front camera 19 on the liquid crystal display 15 of the navigation device 1, and further displays guidance objects 61 on the liquid crystal display 15, by which the guidance objects 61 are displayed superimposed on a view around the vehicle, whereas the superimposed-image display device according to the second embodiment uses a head-up display system as means for displaying images that are superimposed on a view around the vehicle.

A schematic configuration of the superimposed-image display device according to the second embodiment will be described below using FIG. 15. FIG. 15 is a schematic configuration diagram of a superimposed-image display device 101 according to the second embodiment.

Figure 15:
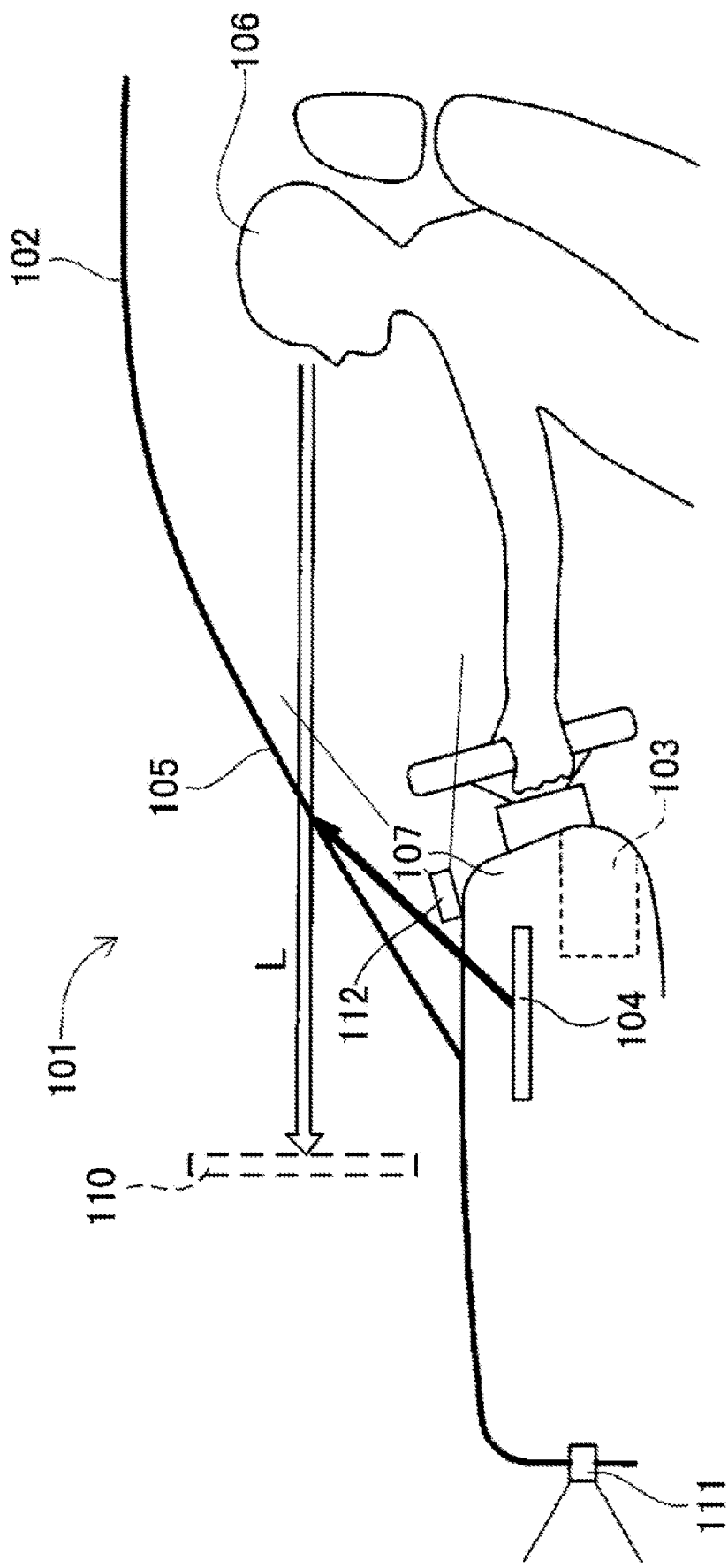
FIG. 15 is a schematic configuration diagram of a superimposed-image display device according to a second embodiment.

As shown in FIG. 15, the superimposed-image display device 101 basically includes a navigation device 103 mounted on a vehicle 102; and a front display 104 that is likewise mounted on the vehicle 102 and is connected to the navigation device 103. Note that the front display 104 is information providing means that functions as a head-up display with a windshield 105 of the vehicle 102, and provides various pieces of information to an occupant 106 of the vehicle 102.

Here, the front display 104 is a liquid crystal display that is installed inside a dashboard 107 of the vehicle 102 and that has a function of displaying an image on an image display plane provided on the front thereof. As a backlight, for example, a cold cathode fluorescent lamp (CCFL) or a white LED is used. Note that for the front display 104, an organic EL display or a combination of a liquid crystal projector and a screen may be used other than a liquid crystal display.

The front display 104 functions as a head-up display with the windshield 105 of the vehicle 102, and is configured such that an image outputted from the front display 104 is reflected on the windshield 105 in front of a driver's seat so that the occupant 106 of the vehicle 102 visually identifies the image. Note that guidance objects are displayed on the front display 104, as necessary. Note that in the second embodiment which will be described below, as in the first embodiment, guidance objects are guidance information for providing guidance on a vehicle's future course and a guidance divergence point present ahead in a traveling direction of the vehicle 102. More specifically, the guidance objects are a plurality of triangular images that are displayed in a superimposed manner such that the triangular images are located ahead in a traveling direction of the vehicle 102 and match the elevation of the line of sight of the occupant 106 of the vehicle 102, the triangular images are shifted to locations that are on the opposite side to an exit direction at the guidance divergence point relative to the front of the vehicle 102, and the triangular images indicate a vehicle's future course.

In addition, it is configured such that when the occupant 106 visually identifies video displayed on the front display 104 such that the video is reflected on the windshield 105, the occupant 106 visually identifies, as a virtual image 110, the video that is displayed on the front display 104 at a location far ahead of the windshield 105, instead of at the location of the windshield 105. In addition, the virtual image 110 is displayed superimposed on a surrounding environment (a view or an actual view) ahead of the vehicle 102. For example, the virtual image 110 can also be displayed superimposed on any object (a road surface, a building, a thing that is a warning target, etc.) located ahead of the vehicle 102.

Here, a location at which the virtual image 110 is created, more specifically, a distance from the occupant 106 to the virtual image 110 (hereinafter, referred to as image-forming distance) L is determined by the location of the front display 104. For example, the image-forming distance L is determined by a distance along an optical path (optical path length) from a location on the front display 104 at which video is displayed to the windshield 105. For example, the optical path length is set such that the image-forming distance L is 1.5 m.

In addition, a front camera 111 is installed on top of a front bumper of the vehicle 102, the backside of a rearview mirror, etc. In the example shown in FIG. 15, the front camera 111 is mounted on top of the front bumper. The front camera 111 is, for example, an imaging device including a camera that uses a solid-state imaging device such as a CCD, and is installed such that an optical-axis direction is directed ahead in a traveling direction of the vehicle 102. By performing image processing on a captured image that is captured by the front camera 111, conditions of a front environment (i.e., an environment on which the virtual image 110 is superimposed) which is visually identified by the occupant 106 through the windshield 105, etc., are detected. Note that instead of the front camera 111, a sensor such as millimeter-wave radar may be used.

In addition, an in-vehicle camera 112 is installed on a top surface of an instrument panel of the vehicle 102. The in-vehicle camera 112 is, for example, an imaging device including a camera that uses a solid-state imaging device such as a CCD, and is installed such that an optical-axis direction is directed toward the driver's seat. An area in the vehicle 102 in which an occupant's face is expected to be generally located is set as a detection area (a capturing area of the in-vehicle camera 112), and a face of the occupant 106 sitting in the driver's seat is captured. Then, by performing image processing on a captured image that is captured by the in-vehicle camera 112, locations of eyes of the occupant 106, i.e., a location corresponding to the elevation of the line of sight (a start point of the line of sight), and a line-of-sight direction are detected.

Figure 16:
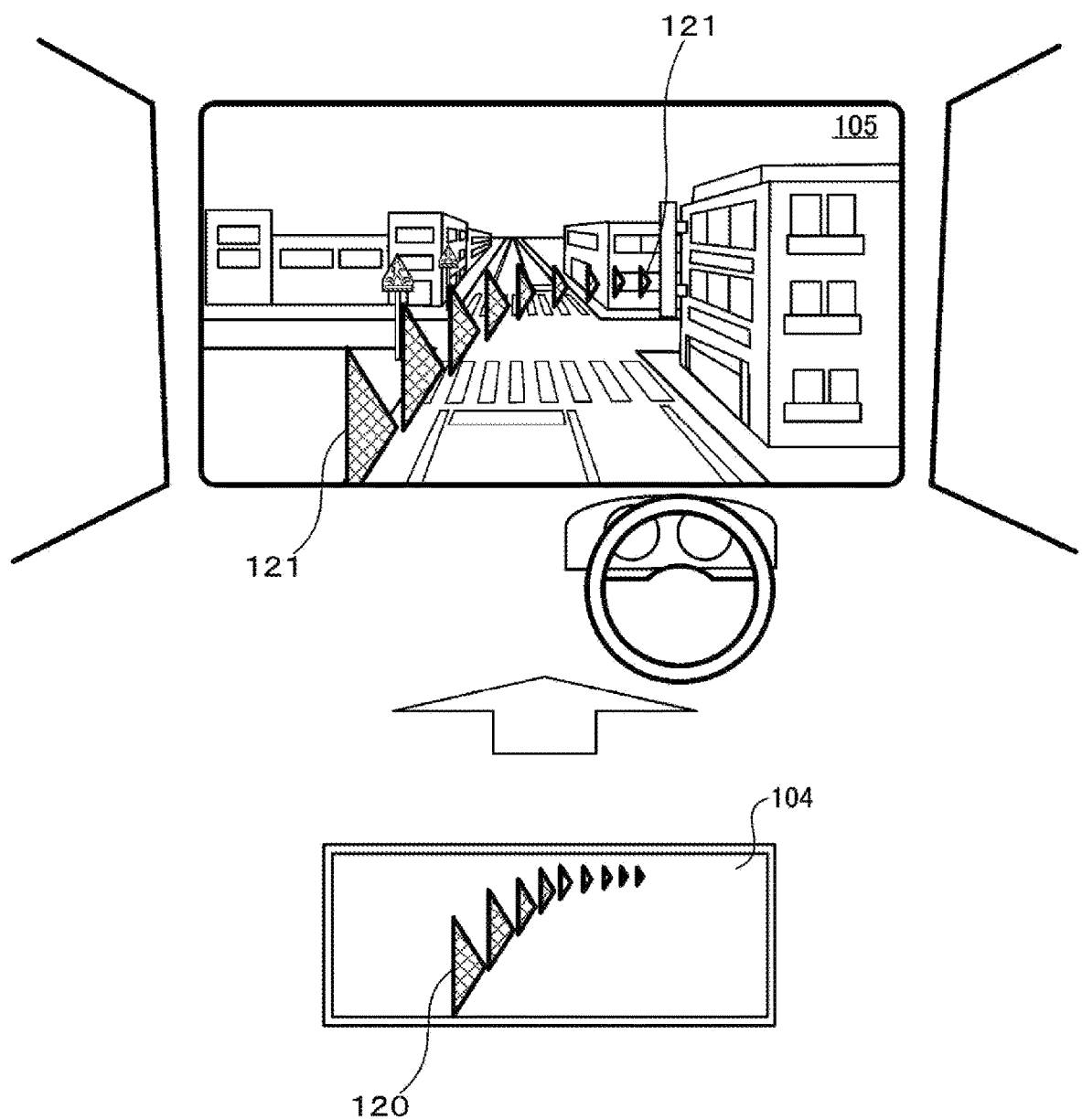
FIG. 16 is a diagram showing virtual images of images of guidance objects displayed superimposed on a view through a windshield, according to the second embodiment.

The superimposed-image display device according to the second embodiment displays, as shown in FIG. 16, images 120 of guidance objects on the front display 104 at S6 and S7 of the aforementioned travel assistance process program (FIG. 2). As a result, by the occupant 106 of the vehicle 102 visually identifying the images 120 of guidance objects displayed on the front display 104 as shown in FIG. 16, virtual images 121 of the images 120 of guidance objects are visually identified superimposed on a view through the windshield 105.

Accordingly, as with the superimposed-image display device according to the first embodiment, a course of the vehicle 102, the location of a guidance divergence point 51 at which a left or right turn is to be made, and an exit direction at the guidance divergence point 51 can be accurately grasped. In addition, by adjusting the locations at which the virtual images 121 are displayed to the elevation of the line of sight of the occupant 106, as in the first embodiment, the visibility of the virtual images 121 can be increased. For example, as in the first embodiment, the virtual images 121 may be displayed at locations with a predetermined height (e.g., 1 m) from a road surface, or may be displayed so as to match a location corresponding to the elevation of the line of sight of the occupant 106 that is detected by the in-vehicle camera 112. Note that in the second embodiment, it is desirable that the current location and orientation of the host vehicle that are identified in three-dimensional space at S6 and S7 of FIG. 2 be the location and line-of-sight direction of the occupant 106 of the vehicle 102 that are detected using the in-vehicle camera 112.

Note that the present disclosure is not limited to the above-described embodiments, and it is, of course, possible to make various modifications and alterations thereto without departing from the spirit and scope of the present disclosure.

For example, as means for displaying images that are superimposed on a view around the vehicle, the liquid crystal display 15 on which an actual view image is displayed is used in the first embodiment, and a head-up display system is used in the second embodiment, but a windshield display (WSD) that displays an image on a windshield may be used. In the WSD, video may be displayed from a projector, using the windshield as a screen, or the windshield may be a transmissive liquid crystal display. An image displayed on the windshield by the WSD is an image that is superimposed on a view around the vehicle.

Figure 17:
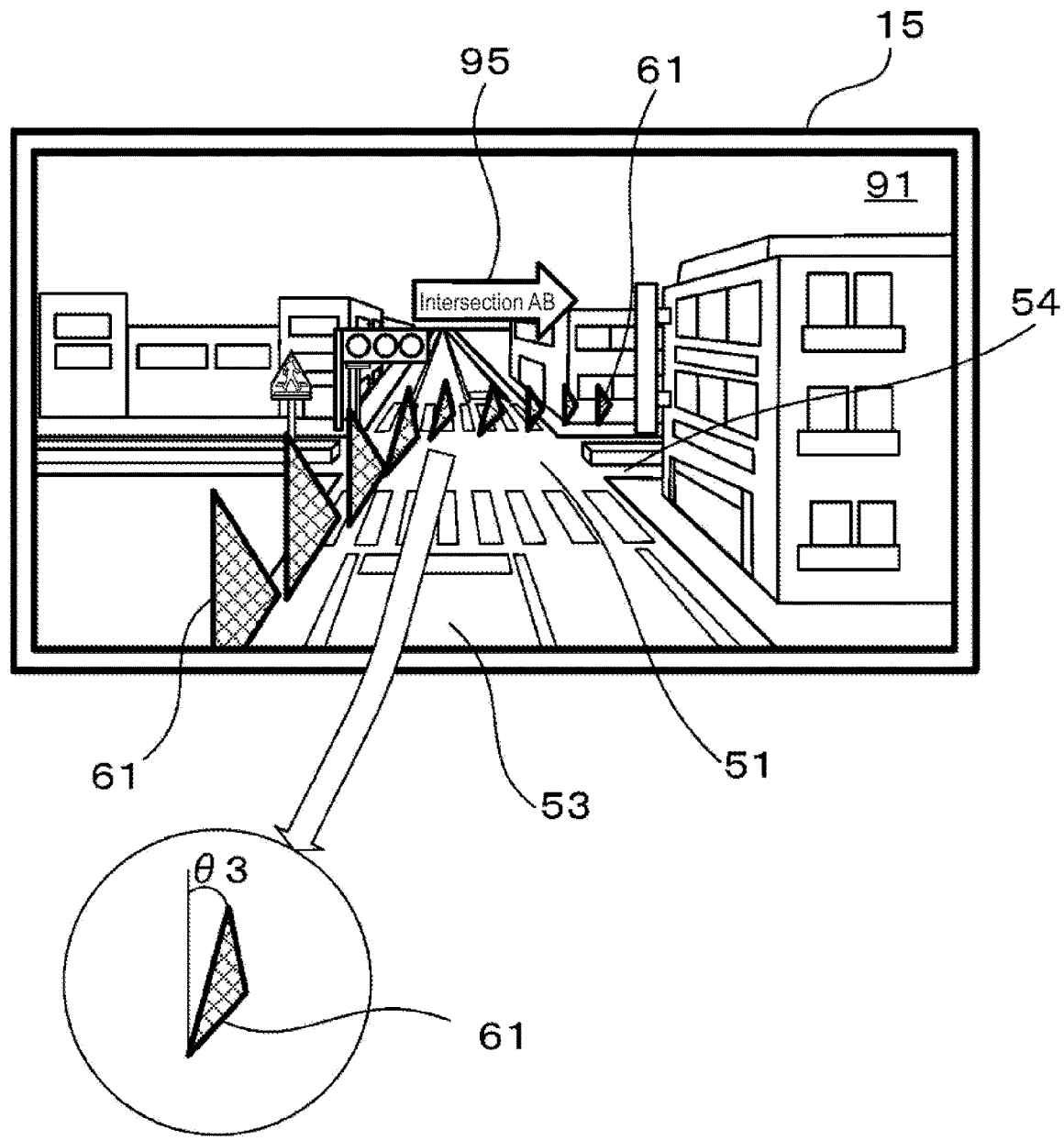
FIG. 17 is a diagram showing a travel guidance screen displayed on the liquid crystal display in another example.

In addition, in the above-described embodiments, guidance objects are arranged in a direction perpendicular to a road surface, but the configuration is not limited thereto. For example, as shown in FIG. 17, the CPU 41 may incline guidance objects 61 arranged on the arc 85A (see FIG. 10) at a predetermined angle θ3 toward the inner side of a curved course (the inner side of the arc 85A). By this, by inclining the guidance objects 61 at the angle θ3 with respect to the direction perpendicular to the road surface, the occupant can easily visually identify that the course is curved.

In addition, in the first and second embodiments, as guidance objects, triangular images are adopted that indicate a vehicle's future course and a traveling direction of the vehicle at a guidance divergence point present ahead in a traveling direction of the vehicle, but other images may be adopted. For example, the guidance objects 61 and 95 may be images of arrows.

In addition, in the first and second embodiments, guidance on the guidance divergence point 51 is provided using the guidance objects 61 and 95, but the configuration is not limited to guidance on the guidance divergence point 51 using the guidance objects 61 and 95, and for example, other points that alert the occupant of the vehicle, such as a lane reduction point and a merge section, may be used.

In addition, in the first and second embodiments, travel assistance using the guidance objects 61 and 95 is provided upon traveling on a general road, but may be provided upon traveling on an expressway, or may be provided upon traveling on both of a general road and an expressway.

In addition, in the first embodiment, an actual view image captured by the front camera 19 and guidance objects 61 are displayed on the liquid crystal display 15 of the navigation device 1, but for a display that displays an actual view image and guidance objects 61, any other display than the liquid crystal display 15 may be used as long as the display is disposed in the vehicle.

In addition, in the second embodiment, it is configured such that the virtual images 121 are created ahead of the windshield 105 of the vehicle 102 by the front display 104, but it may be configured such that the virtual images 121 are created ahead of a window other than the windshield 105. In addition, a target on which video is reflected by the front display 104 may be a visor (combiner) installed around the windshield 105, instead of the windshield 105 itself.

In addition, in the first and second embodiments, it is configured such that the processes of the travel assistance process program (FIG. 2) are performed by the navigation ECU 13 of the navigation device 1, but the subject that performs the processes can be changed as appropriate. For example, it may be configured such that the processes are performed by a control part of the liquid crystal display 15, a vehicle control ECU, or other in-vehicle devices.

What is claimed is:

1. A superimposed-image display device that is mounted on a vehicle and superimposes a guidance object on a view around the vehicle so that an occupant of the vehicle visually identifies the guidance object, the guidance object providing guidance on a course to the occupant, the superimposed-image display device comprising:
   object displaying means for displaying a plurality of guidance objects when there is a guidance divergence point ahead in a traveling direction of the vehicle, the guidance divergence point being a guidance target, and the plurality of guidance objects providing guidance on an entry route that enters the guidance divergence point and an exit route that exits from the guidance divergence point,
   wherein
   the object displaying means displays a course including the entry route, the guidance divergence point, and the exit route using the plurality of guidance objects, displays the plurality of guidance objects such that the plurality of guidance objects match an elevation of a line of sight of the occupant of the vehicle, and displays the plurality of guidance objects such that the plurality of guidance objects are shifted toward an opposite side to an exit direction at the guidance divergence point relative to front of the vehicle.

2. The superimposed-image display device according to claim 1, wherein
   the object display means
   displays, in the entry route, corresponding ones of the plurality of guidance objects at locations shifted by a certain distance from a center of the vehicle in a vehicle width direction, and
   displays, in the exit route, corresponding ones of the plurality of guidance objects at locations shifted by a distance determined based on a number of lanes on the exit route from a center of a road on the exit route.

3. The superimposed-image display device according to claim 2, wherein
   the object displaying means
   displays, in the entry route, corresponding ones of the plurality of guidance objects at locations shifted by a distance corresponding to a half-lane from the front of the vehicle and the center of the vehicle in the vehicle width direction toward the opposite side to the exit direction, and
   displays, in the exit route, corresponding ones of the plurality of guidance objects at locations shifted by a distance corresponding to a number of lanes on the course from the center of the road on the exit route toward a course side.

4. The superimposed-image display device according to claim 3, wherein the object displaying means sets a circle that touches two straight lines including an entry route straight line and an exit route straight line, and displays corresponding ones of the plurality of guidance objects side by side along the circle within the guidance divergence point, the entry route straight line being a straight line extending along the course on the entry route, and the exit route straight line being a straight line extending along the course on the exit route.

5. The superimposed-image display device according to claim 3, wherein the object displaying means performs a process with reference to links in map information, the process displaying the plurality of guidance objects such that the plurality of guidance objects are shifted to locations that are on the opposite side to the exit direction relative to the front of the vehicle.

6. The superimposed-image display device according to claim 2, wherein the object displaying means sets a circle that touches two straight lines including an entry route straight line and an exit route straight line, and displays corresponding ones of the plurality of guidance objects side by side along the circle within the guidance divergence point, the entry route straight line being a straight line extending along the course on the entry route, and the exit route straight line being a straight line extending along the course on the exit route.

7. The superimposed-image display device according to claim 2, wherein the object displaying means performs a process with reference to links in map information, the process displaying the plurality of guidance objects such that the plurality of guidance objects are shifted to locations that are on the opposite side to the exit direction relative to the front of the vehicle.

8. The superimposed-image display device according to claim 1, wherein the object displaying means sets a circle that touches two straight lines including an entry route straight line and an exit route straight line, and displays corresponding ones of the plurality of guidance objects side by side along the circle within the guidance divergence point, the entry route straight line being a straight line extending along the course on the entry route, and the exit route straight line being a straight line extending along the course on the exit route.

9. The superimposed-image display device according to claim 8, wherein the object displaying means performs a process with reference to links in map information, the process displaying the plurality of guidance objects such that the plurality of guidance objects are shifted to locations that are on the opposite side to the exit direction relative to the front of the vehicle.

10. The superimposed-image display device according to claim 1, wherein the object displaying means performs a process with reference to links in map information, the process displaying the plurality of guidance objects such that the plurality of guidance objects are shifted to locations that are on the opposite side to the exit direction relative to the front of the vehicle.

* * * * *